United States Patent
Yang et al.

(10) Patent No.: US 10,299,034 B2
(45) Date of Patent: May 21, 2019

(54) ELECTRONIC DEVICE AND INPUT/OUTPUT METHOD THEREOF

(71) Applicant: Samsung Electronics Co., Ltd., Gyeonggi-do (KR)

(72) Inventors: Jae-Mo Yang, Gyeonggi-do (KR); Beak-Kwon Son, Gyeonggi-do (KR); Nam-Il Lee, Gyeonggi-do (KR); Jong-Mo Kum, Seoul (KR); Gang-Youl Kim, Gyeonggi-do (KR); Ho-Chul Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 90 days.

(21) Appl. No.: 15/151,007

(22) Filed: May 10, 2016

(65) Prior Publication Data
US 2017/0013354 A1    Jan. 12, 2017

(30) Foreign Application Priority Data
Jul. 10, 2015    (KR) .................. 10-2015-0098538

(51) Int. Cl.
| | |
|---|---|
| *H04R 3/00* | (2006.01) |
| *H04R 1/32* | (2006.01) |
| *H04R 3/04* | (2006.01) |
| *H04R 1/08* | (2006.01) |
| *G06F 3/16* | (2006.01) |

(52) U.S. Cl.
CPC ............. *H04R 1/326* (2013.01); *G06F 3/162* (2013.01); *H04R 1/08* (2013.01); *H04R 3/005* (2013.01); *H04R 3/04* (2013.01); *H04R 2499/11* (2013.01); *H04R 2499/15* (2013.01)

(58) Field of Classification Search
CPC ............ H04R 1/326; H04R 1/08; G06F 3/162
See application file for complete search history.

(56) References Cited

U.S. PATENT DOCUMENTS 8,565,446 B1    10/2013  Ebenezer
9,767,818 B1 *   9/2017  Jain ..................... G10L 21/0208
(Continued)

FOREIGN PATENT DOCUMENTS

| CN | 1751540 | 3/2006 |
|---|---|---|
| CN | 101165775 | 4/2008 |

(Continued)

OTHER PUBLICATIONS

Zohra Yermeche et al., "Moving Source Speech Enhancement Using Time-Delay Estimation", XP-002528193, Sep. 12, 2005, 4 pages.

(Continued)

*Primary Examiner* — Simon King
(74) *Attorney, Agent, or Firm* — The Farrell Law Firm, P.C.

(57) ABSTRACT

An electronic device is provided. The electronic device includes a plurality of microphones, a memory configured to store a first specified time set to form a beam in a first direction using the plurality of microphones, and a processor connected to the plurality of microphones and configured to receive a sound using the plurality of microphones, determine a direction corresponding to the received sound, and if the direction is equivalent to a second direction, associate a second specified time to the received sound as if a beam is formed in the second direction using the plurality of microphones.

18 Claims, 25 Drawing Sheets

(56) References Cited

U.S. PATENT DOCUMENTS

| | | | |
|---|---|---|---|
| 9,940,949 B1* | 4/2018 | Vitaladevuni | G10L 25/78 |
| 2002/0131580 A1 | 9/2002 | Smith | |
| 2004/0034305 A1* | 2/2004 | Song | G01S 7/52038 |
| | | | 600/447 |
| 2006/0167963 A1 | 7/2006 | Bruno et al. | |
| 2010/0111314 A1 | 5/2010 | Jae Wook et al. | |
| 2010/0128892 A1 | 5/2010 | Chen et al. | |
| 2010/0150364 A1* | 6/2010 | Buck | G01S 3/807 |
| | | | 381/66 |
| 2010/0215184 A1* | 8/2010 | Buck | H04M 9/082 |
| | | | 381/66 |
| 2011/0069846 A1* | 3/2011 | Cheng | H04R 3/005 |
| | | | 381/92 |
| 2012/0182429 A1 | 7/2012 | Forutanpour et al. | |
| 2012/0188371 A1 | 7/2012 | Chen et al. | |
| 2013/0114835 A1* | 5/2013 | Holmberg | H04R 25/407 |
| | | | 381/313 |
| 2013/0116012 A1* | 5/2013 | Okayasu | H04M 1/6091 |
| | | | 455/566 |
| 2014/0219471 A1 | 8/2014 | Deshpande et al. | |
| 2014/0286497 A1* | 9/2014 | Thyssen | H04R 3/005 |
| | | | 381/66 |
| 2014/0307883 A1 | 10/2014 | Buck et al. | |
| 2014/0362253 A1 | 12/2014 | Kim et al. | |
| 2015/0016628 A1 | 1/2015 | Li | |
| 2016/0011851 A1* | 1/2016 | Zhang | H04R 3/12 |
| | | | 715/716 |

FOREIGN PATENT DOCUMENTS

| | | |
|---|---|---|
| CN | 102024456 | 5/2012 |
| EP | 1 116 961 | 7/2001 |
| EP | 2 197 219 | 6/2010 |
| JP | 11-41687 | 2/1999 |
| JP | 2006-311104 | 11/2006 |
| JP | 2008-219884 | 9/2008 |
| JP | 2009-141560 | 6/2009 |
| KR | 2009-0016205 | 2/2009 |
| KR | 10-1483513 | 1/2015 |

OTHER PUBLICATIONS

International Search Report dated Oct. 12, 2016 issued in counterpart application No. PCT/KR2016/007378, 11 pages.
European Search Report dated Nov. 18, 2016 issued in counterpart application No. 16169211.6-1910, 8 pages.
Chinese Office Action dated Feb. 2, 2019 issued in counterpart application No. 201680040579.1, 15 pages.

* cited by examiner

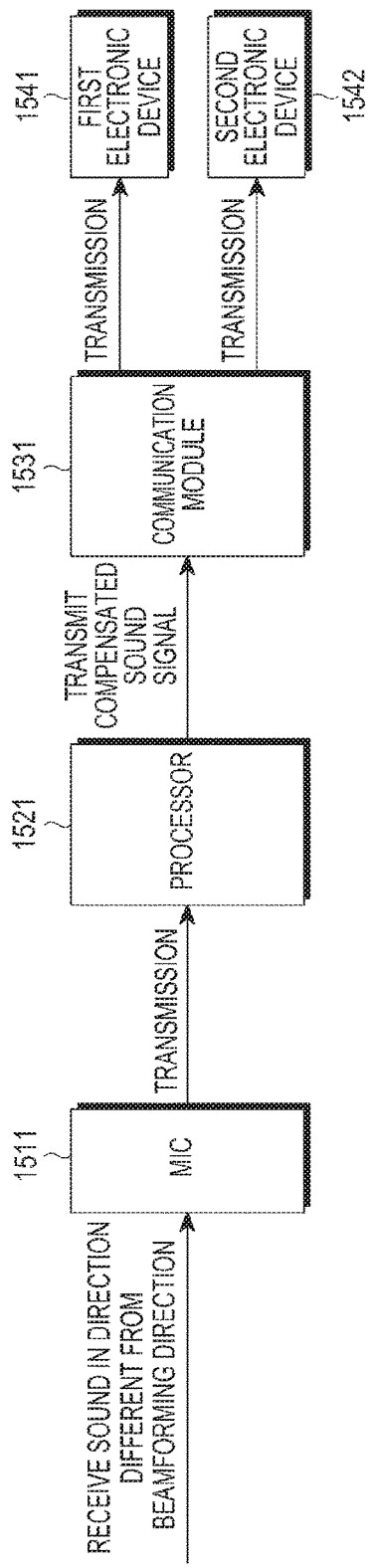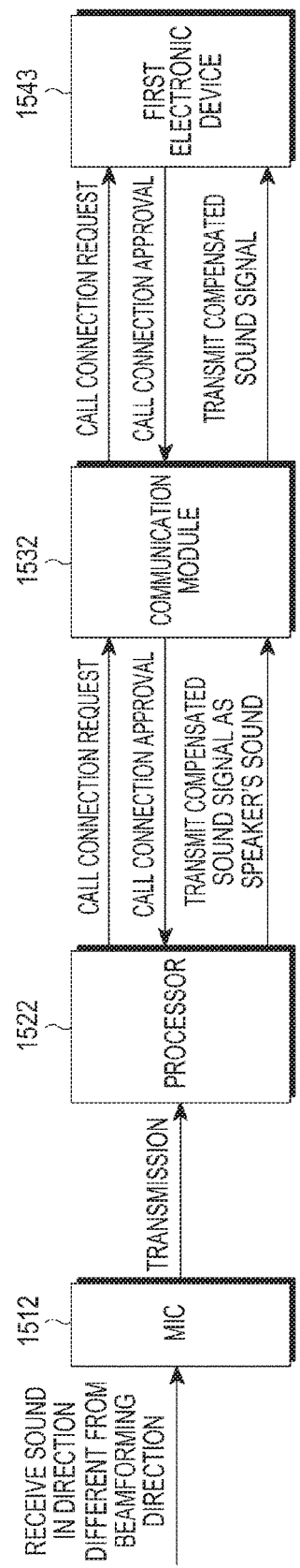
FIG.15A
FIG.15B

ELECTRONIC DEVICE AND INPUT/OUTPUT METHOD THEREOF

PRIORITY

This application claims priority under 35 U.S.C. § 119(a) to Korean Patent Application Serial No. 10-2015-0098538, which was filed in the Korean Intellectual Property Office on Jul. 10, 2015, the entire disclosure of which is incorporated herein by reference.

BACKGROUND

1. Field of the Disclosure

The present disclosure relates generally to an electronic device, and more particularly, to a beamforming control method and an electronic device for controlling beamforming.

2. Description of the Related Art

With the rapid growth of the smart phone market, various electronic devices are equipped with all or some of the features of the smart phone.

As the multimedia capabilities of the smart phone have been enhanced, multiple microphones may be mounted in the device. For example, two or more microphones may be mounted in the smart phone. By using these multiple microphones, the user may use multiple recording techniques in the smart phone.

Beamforming, which is based on multiple microphones, is configured for determining a sound receiving range for receiving a sound in a specific direction from an electronic device.

Generally, beamforming technology having a fixed sound receiving range is widely used, and the smart phone may record (or output) the sound in a predetermined range having the directional characteristics, and the smart phone may exclude the sound received in the other ranges from the recording (or the outputting). Examples of the fixed-beamforming technology may include minimum variance distortionless response (MVDR) and linearly constrained minimum variance (LCMV) methods, and when a beam is formed (or generated), the beamforming direction may be typically configured in a radial manner on the basis of the front (0°-direction) or rear (180°-direction) of the electronic device. For example, depending on the number of multiple microphones, the radial width may be narrower and/or the performance of the electronic device may be improved.

On the other hand, the location of a speaker (or a talker) may be tracked using direction-of-arrival (DOA) technology, which is for detecting the direction in which waves arrive from any one point, using multiple microphone sensors; this sensor configuration is referred to as a sensor array, and is presently used in conjunction with beamforming technology for estimating a signal in a predetermined direction.

As described above, the fixed-beamforming technology may control the beamforming direction during use thereof, and may ensure the stable performance.

However, the fixed-beamforming technology may be disadvantageous in that the direction of a beam (e.g., the direction of beamforming, or the direction of a received sound) is fixed. In order to perform beamforming for a speaker moving in an arbitrary direction, it is necessary to use an adaptive filter, or to find a beamformer filter in real time and apply the beamformer filter to each of received signals, causing an increase in the computation and the power consumption. For the adaptive beamforming technology based on the adaptive filter, its physical implementation is not easy, and the filter adaptation may not operate normally in the actual beamforming environment.

In a case where the orientation of the fixed beamformer is changed in real time, the amount of required computation may be very large, resulting in the difficulty of its real-time implementation. For example, the performance of beamforming tracking for a fast-moving speaker may not be guaranteed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure have been made to address at least the above-mentioned problems and/or disadvantages and to provide at least the advantages described below. Accordingly, an aspect of the present disclosure provides arbitrarily changing an incident angle of a signal by adjusting a delay time of a multi-microphone input signal.

Another aspect of the present disclosure is to provide an electronic device capable of forming a virtual beam area in a direction other than the orientation of the conventional fixed beamformer.

In accordance with one aspect of the present disclosure, there is provided an electronic device. The electronic device includes a plurality of microphones, a memory configured to store a first specified time set to form a beam in a first direction using the plurality of microphones, and a processor connected to the plurality of microphones and configured to receive a sound using the plurality of microphones, determine a direction corresponding to the received sound, and if the direction is equivalent to a second direction, associate a second specified time to the received sound as if a beam is formed in the second direction using the plurality of microphones.

In accordance with another aspect of the present disclosure, there is provided an input/output method of an electronic device. The input/output method includes storing a first specified time to form a beam, receiving a sound using a plurality of microphones, determining a direction corresponding to the received sound, and if the direction is equivalent to a second direction, associating a second specified time to the received sound as if a beam is formed in the second direction using the plurality of microphones.

In accordance with further another aspect of the present disclosure, there is provided an electronic device. The electronic device includes a plurality of microphones, and a reception time compensator configured to form a beam in a first direction using the plurality of microphones, determine a direction of a sound received using the plurality of microphones, and if the direction is equivalent to a second direction that is different from the first direction, change a microphone array delay of the received sound to a microphone array delay corresponding to the first direction.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 15A-15D are diagrams illustrating operations of transmitting and receiving a compensated sound to/from electronic devices using a communication module, according to an embodiment of the present disclosure.

Throughout the drawings, like reference numerals will be understood to refer to like parts, components, and structures.

DETAILED DESCRIPTION

Figure 1:
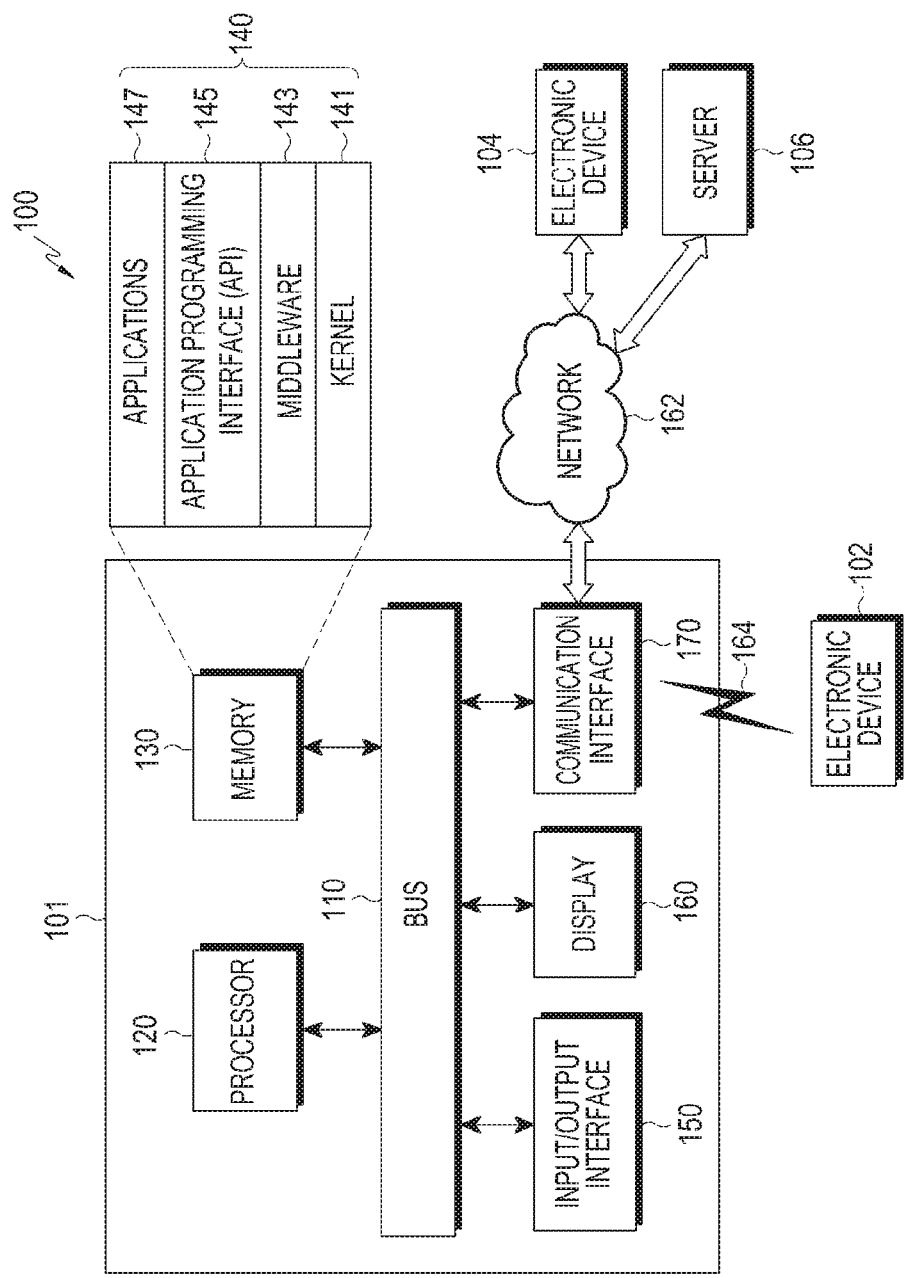
FIG. 1 is a diagram illustrating an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

An electronic device according to embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. The wearable device may include at least one of an accessory-type wearable device (e.g., a watch, a ring, a bracelet, an anklet, a necklace, glasses, contact lens or a head mounted device (HMD)), a textile/clothing integrated wearable device (e.g., electronic clothing), body-mounted wearable device (e.g., skin pad or tattoo), or a body-implantable wearable device (e.g., implantable circuit).

The electronic device may be a home appliance. The home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or Play Station™), an electronic dictionary, an electronic key, a camcorder or a digital photo frame.

The electronic device may include at least one of various medical devices (e.g., various portable medical measurement devices (such as a blood glucose meter, a heart rate monitor, a blood pressure monitor, a thermometer or the like), magnetic resonance angiography (MRA) devices, magnetic resonance imaging (MRI) devices, computed tomography (CT) devices, a medical camcorder, an ultrasonic device or the like), a navigation device, a global navigation satellite system (GNSS) receiver, an event data recorder (EDR), a flight data recorder (FDR), an automotive infotainment device, a marine electronic device (e.g., a marine navigation device, a gyro compass or the like), an avionics device, a security device, a car head unit, an industrial or household robot, an automatic teller's machine (ATM) for banks, point of sales (POS) devices for shops, or an Internet of Things (IoT) device (e.g., an electric light bulb, various sensors, an electricity or gas meter, a sprinkler device, a fire alarm, a thermostat, a streetlamp, a toaster, fitness equipment, a hot water tank, a heater, a boiler or the like).

The electronic device may include at least one of a part of the furniture or building/structure, an electronic board, an electronic signature receiving device, a projector, or various meters (e.g., meters for water, electricity, gas or radio waves). The electronic device may be one or a combination of the above-described devices. An electronic device may be a flexible electronic device. Further, an electronic device is not be limited to the above-described devices, and may include a new electronic device based on the development of new technologies.

An electronic device of the present disclosure will be described with reference to the accompanying drawings. As used herein, the term 'user' may refer to a person who uses the electronic device, or a device (e.g., an artificial intelligence electronic device) that uses the electronic device.

FIG. 1 is a diagram illustrating an electronic device 101 in a network environment 100, according to an embodiment of the present disclosure. The electronic device 101 include a bus 110, a processor 120, a memory 130, an input/output (I/O) interface 150, a display 160, and a communication interface 170. The electronic device 101 may omit at least one of the components, or may include other components.

The bus 110 may include, for example, a circuit that connects the components 110 170 to each other, and transfers the communication (e.g., a control message and/or data) between the components 110-170.

The processor 120 may include one or more of a central processing units (CPUs), an application processor (AP) or a communication processor (CP). The processor 120 may, for example, execute a control and/or communication-related operation or data processing for at least one other component of the electronic device 101.

The memory 130 may include a volatile and/or non-volatile memory. The memory 130 may, for example, store a command or data related to at least one other component of the electronic device 101. The memory 130 may store software and/or a program 140. The program 140 may include, for example, a kernel 141, a middleware 143, an application programming interface (API) 145, and/or an application program(s) (or application) 147. At least some of the kernel 141, the middleware 143 or the API 145 may be referred to as an operating system (OS). Herein, the application may be referred to as 'app'.

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give priority capable of using the system resources (e.g., the bus 110, the processor 120, the memory 130 or the like) of the electronic device 101, to at least one of the application programs 147. For example, the middleware 143 may process the one or more work requests according to the priority given to at least one of the application programs 147, thereby performing scheduling or load balancing for the one or more work requests.

The API 145, for example, is an interface by which the application program 147 controls the function provided in the kernel 141 or the middleware 143, and may include at least one interface or function (e.g., a command) for, for example, file control, window control, image processing or character control.

The I/O interface 150 may, for example, serve as an interface that can transfer a command or data received from the user or other external device to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body. The display 160 may be used synonymously with the touch screen.

The communication interface 170 may, for example, establish communication between the electronic device 101 and an external device (e.g., a first external electronic device 102, a second external electronic device 104 or a server 106). For example, the communication interface 170 may communicate with the second external electronic device 104 or the server 106 by being connected to a network 162 using wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunications system (UMTS), wireless broadband (WiBro) or global system for mobile communications (GSM), as a cellular communication protocol. Further, the wireless communication may include, for example, short range communication 164. The short range communication 164 may include at least one of, for example, wireless fidelity (WiFi), Bluetooth (BT), near field communication (NFC) or global navigation satellite system (GNSS). Depending on the use area or the bandwidth, GNSS may include at least one of, for example, global positioning system (GPS), global navigation satellite system (Glonass), navigation satellite system (Beidou or Galileo), or the European global satellite-based navigation system. Herein, the term "GPS" may be interchangeably used with the term "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet, or the telephone network.

Each of the first and second external electronic devices 102 and 104 may be identical or non-identical in type to the electronic device 101. The server 106 may include a group of one or more servers. All or some of the operations executed in the electronic device 101 may be executed the first and second external electronic devices 102 and 104 or the server 106. If the electronic device 101 performs a certain function or service automatically or upon request, the electronic device 101 may request at least some of the functions related thereto from the first and second external electronic devices 102 and 104 or the server 106), instead of or in addition to spontaneously executing the function or service. The first and second external electronic devices 102 and 104 or the server 106 may execute the requested function or additional function, and transfer the results to the electronic device 101. The electronic device 101 may process the received results intact or additionally, to provide the requested function or service. To this end, for example, the cloud computing, distributed computing, or client-server computing technology may be used.

Figure 2:
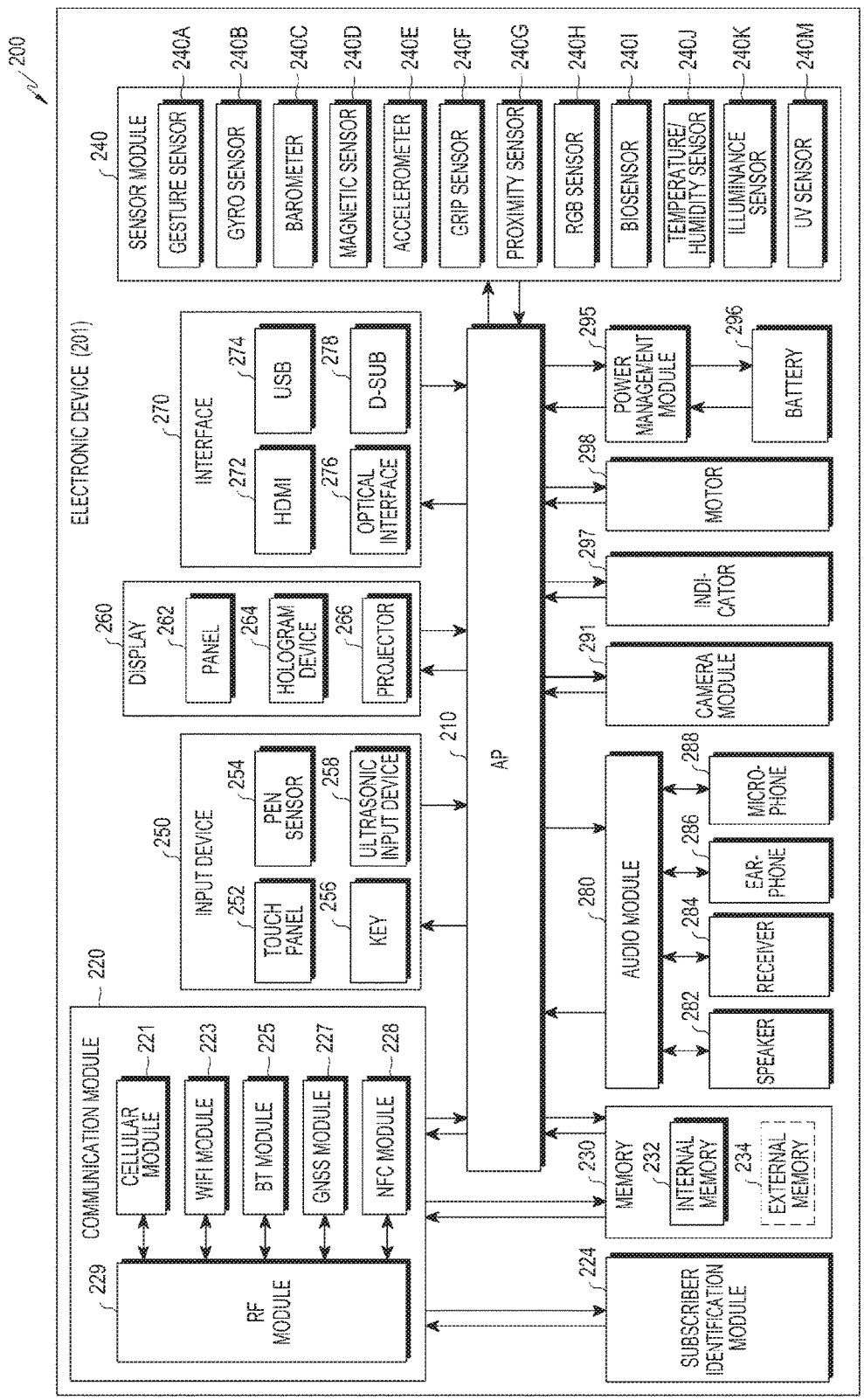
FIG. 2 is a diagram of an electronic device, according to an embodiment of the present disclosure.

FIG. 2 is a diagram of an electronic device 201, according to an embodiment of the present disclosure. The electronic device 201 may include, for example, all or part of the components of the electronic device 101 of FIG. 1. The electronic device 201 includes, for example, at least one processor (e.g., an application processor (AP)) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297 and a motor 298.

The processor 210 may, for example, control a plurality of hardware or software components connected to the processor 210 by running the operating system or application program, and may process and compute a variety of data. The processor 210 may, for example, be implemented as a system on chip (SoC). The processor 210 may further include a graphic processing unit (GPU) and/or an image signal processor. The processor 210 may include at least some (e.g., a cellular module 221) of the components shown in FIG. 2. The processor 210 may load, on a volatile memory, a command or data received from at least one of other components (e.g., a non-volatile memory) and process the loaded data, and may store a variety of data in a non-volatile memory.

The communication module 220 may have a structure which is identical or similar to that of the communication interface 170 of FIG. 1. The communication module 220 may include, for example, the cellular module 221, a WiFi module 223, a BT module 225, a GNSS module 227 (e.g., a GPS module, a Glonass module, a Beidou module, or a Galileo module), an NFC module 228, and a radio frequency (RF) module 229.

The cellular module 221 may, for example, provide a voice call service, a video call service, a messaging service or an Internet service over a communication network. The cellular module 221 may perform identification and authentication of the electronic device 201 within the communication network using the SIM card 224. The cellular module 221 may perform some of the functions that can be provided by the processor 210. The cellular module 221 may include a communication processor (CP).

Each of the WiFi module 223, the BT module 225, the GNSS module 227 or the NFC module 228 may include, for example, a processor for processing the data transmitted or received using the corresponding module. At least some (e.g., two or more) of the cellular module 221, WiFi module 223, the BT module 225, the GNSS module 227 or the NFC module 228 may be included in one integrated chip (IC) or IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. At least one of the cellular module 221, the WiFi module 223, the BT module 225, the GNSS module 227 or the NFC module 228 may transmit and receive RF signals using a separate RF module.

The SIM card 224 may be an embedded SIM. The SIM card 224 may include unique identification information (e.g., integrated circuit card identifier (ICCID)) or subscriber information (e.g., international mobile subscriber identity (IMSI)).

The memory 230 may include, for example, an internal memory 232 or an external memory 234. The internal memory 232 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like), hard drive, or solid state drive (SSD)).

The external memory 234 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 234 may be functionally and/or physically connected to the electronic device 201 using various interfaces.

The sensor module 240 may, for example, measure a physical quantity or detect the operating status of the electronic device 201, and convert the measured or detected information into an electrical signal. The sensor module 240 may include at least one of, for example, a gesture sensor 240A, a gyro sensor 240B, a barometer 240C, a magnetic sensor 240D, an accelerometer 240E, a grip sensor 240F, a proximity sensor 240G, a color sensor (e.g., red-green-blue (RGB) sensor) 240H, a biosensor 240I, a temperature/humidity sensor 240J, an illuminance sensor 240K, or a ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. The electronic device 201 may further include a processor that is configured to control the sensor module 240, independently of or as a part of the processor 210, thereby to control the sensor module 240 while the processor 210 is in a sleep state.

The input device 250 may include, for example, a touch panel 252, a (digital) pen sensor 254, a key 256, or an ultrasonic input device 258. The touch panel 252 may, for example, use at least one of the capacitive, resistive, infrared or ultrasonic scheme. The touch panel 252 may further include a control circuit. The touch panel 252 may further include a tactile layer, to provide a tactile or haptic feedback to the user.

The (digital) pen sensor 254, for example, may be a part of the touch panel 252, or may include a separate recognition sheet. The key 256 may include, for example, a physical button, an optical key or a keypad. The ultrasonic input device 258 may detect ultrasonic waves generated in an input tool using a microphone 288, to identify the data corresponding to the detected ultrasonic waves.

The display 260 may include a panel 262, a hologram device 264, or a projector 266. The panel 262 may include a structure which is identical or similar to that of the display 160 of FIG. 1. The panel 262 may, for example, be implemented to be flexible, transparent or wearable. The panel 262, together with the touch panel 252, may be implemented as one module. The hologram device 264 may show stereoscopic images in the air using the interference of the light. The projector 266 may display images by projecting the light on the screen. The screen may, for example, be disposed on the inside or outside of the electronic device 201. The display 260 may further include a control circuit for controlling the panel 262, the hologram device 264, or the projector 266.

The display 160 including the panel 262 may be used interchangeably with the touch screen. In other words, the touch screen may be defined to include the display 160 for display specific information and the panel 262 capable of receiving a touch input.

The interface 270 may include, for example, an HDMI 272, a USB 274, an optical interface 276 or D-subminiature (D-sub) 278. The interface 270 may, for example, be included in the communication interface 170 of FIG. 1. Additionally or alternatively, the interface 270 may include, for example, a mobile high-definition link (MHL) interface, a secure digital (SD) card/multi-media card (MMC) interface or an infrared data association (IrDA) interface.

The audio module 280 may, for example, convert the sounds and the electrical signals bi-directionally. At least some components of the audio module 280 may, for example, be included in the I/O interface 150 of FIG. 1. The audio module 280 may, for example, process the sound information that is received or output using a speaker 282, a receiver 284, an earphone 286 or the microphone 288.

The camera module 291 is, for example, a device capable of capturing still images and videos. The camera module 291 may include one or more image sensors (e.g., a front image sensor or a rear image sensor), a lens, an image signal processor (ISP), or a flash (e.g., an LED or xenon lamp).

The power management module 295 may, for example, manage the power of the electronic device 201. The power management module 295 may include, for example, a power management integrated circuit (PMIC), a charger integrated circuit (IC), or a battery gauge. The PMIC may use wired and/or wireless charging schemes. The wireless charging scheme may include, for example, a magnetic resonance scheme, a magnetic induction scheme, or an electromagnetic scheme, and the power management module 295 may further include additional circuits (e.g., a coil loop, a resonant circuit, a rectifier or the like) for wireless charging. The battery gauge may, for example, measure the remaining capacity, charging voltage, charging current or temperature of the battery 296. The battery 296 may include, for example, a rechargeable battery and/or a solar battery.

The indicator 297 may indicate specific status (e.g., boot status, message status, charging status or the like) of the electronic device 201 or a part (e.g. the processor 210) thereof. The motor 298 may convert an electrical signal into mechanical vibrations, thereby generating a vibration or haptic effect. The electronic device 201 may include a processing device (e.g., GPU) for mobile TV support. The processing device for mobile TV support may, for example, process the media data that is based on the standards such as digital multimedia broadcasting (DMB), digital video broadcasting (DVB) or MediaFLO™.

Each of the components described herein may be configured with one or more components, the names of which may vary depending on the type of the electronic device. The electronic device may include at least one of the components described herein, some of which may be omitted, or may further include additional other components. Further, some of the components of the electronic device may be configured as one entity by being combined, thereby performing the previous functions of the components in the same manner.

Figure 3:
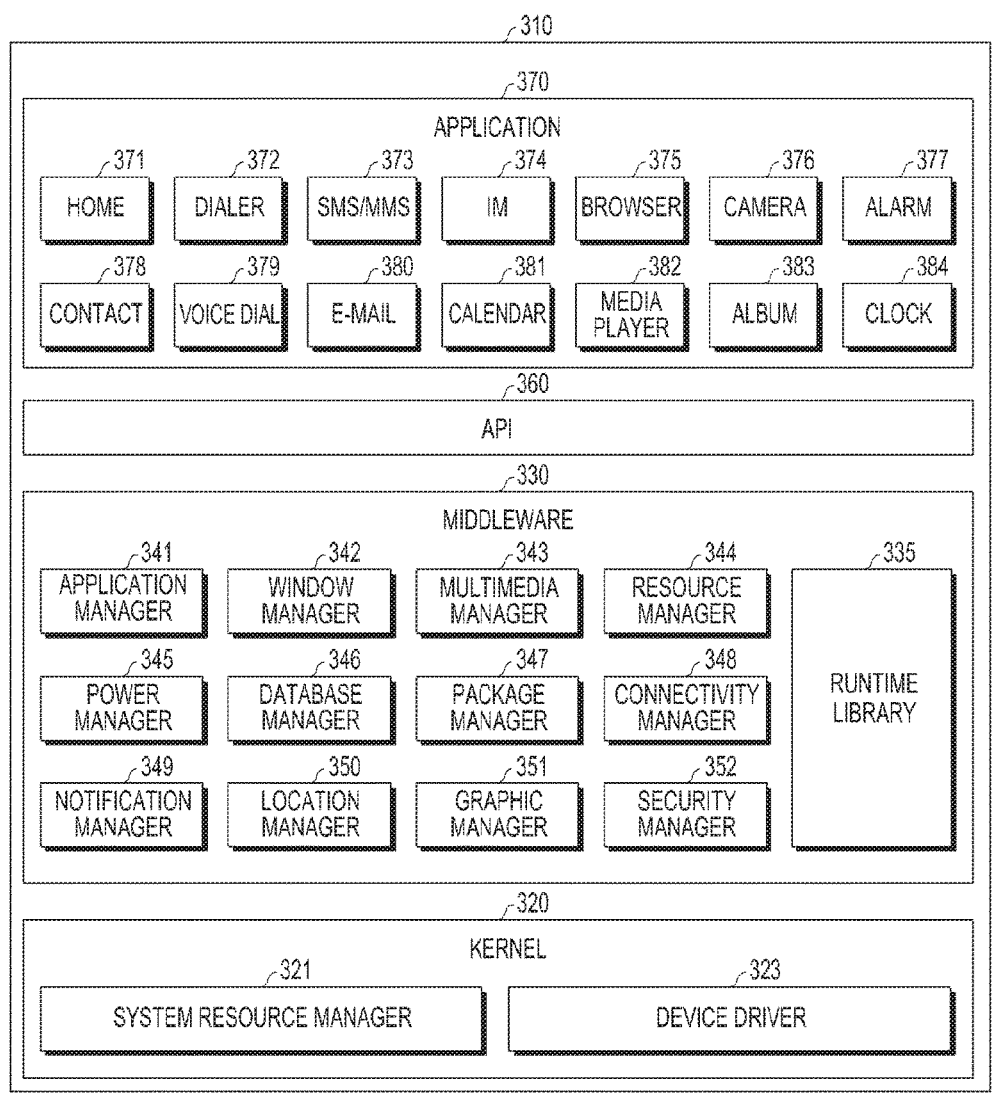
FIG. 3 is a diagram of a program module, according to an embodiment of the present disclosure.

FIG. 3 is a diagram of a program module, according to an embodiment of the present disclosure. A program module 310 may include an OS for controlling the resources related to the electronic device (e.g., the electronic devices 101 or 200), and/or a variety of applications (e.g., the application program 147) that run on the operating system. The operating system may be, for example, Android™, iOS™, Windows™, Symbian™, Tizen™, Bada™ or the like.

The program module 310 may include a kernel 320, a middleware 330, an API 360, and/or an application(s) 370. At least a part of the program module 310 may be preloaded on the electronic device, or downloaded from the first and second external electronic devices 102 and 104 and the server 106.

The kernel 320 may include, for example, a system resource manager 321 and/or a device driver 323. The system resource manager 321 may control, allocate or recover the system resources. The system resource manager 321 may include a process manager, a memory manager, a file system manager or the like. The device driver 323 may include, for example, a display driver, a camera driver, a BT driver, a shared memory driver, a USB driver, a keypad driver, a WiFi driver, an audio driver, or an inter-process communication (IPC) driver.

The middleware 330, for example, may provide a function that is required in common by the application(s) 370, or may provide various functions to the application 370 using the API 360 so that the application 370 may efficiently use the limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function using a programming language while the application 370 is run. The runtime library 335 may perform an I/O management function, a memory management function, an arithmetic function or the like.

The application manager 341 may, for example, manage the life cycle of at least one of the application(s) 370. The window manager 342 may manage GUI resources that are used on the screen. The multimedia manager 343 may determine the format required for playback of various media files, and encode or decode the media files using a codec for the format. The resource manager 344 may manage resources such as a source code, a memory or a storage space for any one of the application(s) 370.

The power manager 345, for example, may manage the battery or power by operating with the basic input/output system (BIOS), and provide power information required for an operation of the electronic device. The database manager 346 may create, search or update the database that is to be used by at least one of the application(s) 370. The package manager 347 may manage installation or update of applications that are distributed in the form of a package file.

The connectivity manager 348 may, for example, manage wireless connection such as WiFi or BT. The notification manager 349 may indicate or notify of events such as message arrival, appointments and proximity in a manner that doesn't interfere with the user. The location manager 350 may manage the location information of the electronic device. The graphic manager 351 may manage the graphic effect to be provided to the user, or the user interface related thereto. The security manager 352 may provide various security functions required for the system security or user authentication. If the electronic device includes a phone function, the middleware 330 may further include a telephony manager for managing the voice or video call function of the electronic device.

The middleware 330 may include a middleware module that forms a combination of various functions of the above-described components. The middleware 330 may provide a module specialized for the type of the operating system in order to provide a differentiated function. Further, the middleware 330 may dynamically remove some of the existing components, or add new components.

The API 360, for example, is a set of API programming functions, and may be provided in a different configuration depending on the operating system. For example, for Android™ or iOS™, the API 360 may provide one API set per platform, and for Tizen™, the API 360 may provide two or more API sets per platform.

The application 370 may include, for example, one or more applications capable of performing functions such as a home 371, a dialer 372, a short message service/multimedia messaging service (SMS/MMS) 373, an instant message (IM) 374, a browser 375, a camera 376, an alarm 377, a contact 378, a voice dial 379, an email 380, a calendar 381, a media player 382, an album 383, a clock 384, healthcare (e.g., for measuring the quantity of exercise, blood glucose levels, and the like), or environmental information provision (e.g., for providing information about the atmospheric pressure, the humidity, the temperature or the like).

The application 370 may include an application (hereinafter, referred to as an 'information exchange application' for convenience of description) for supporting information exchange between the electronic device 101 and the first and second external electronic devices 102 and 104. The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an email application, a healthcare application, an environmental information application or the like) of the electronic device, to the first and second external electronic devices 102 and 104. Further, the notification relay application may, for example, receive notification information from an external electronic device, and provide the received notification information to the user.

The device management application may, for example, manage at least one function (e.g., a function of adjusting the turn-on/off of the first and second external electronic devices 102, 104 itself (or some components thereof) or the brightness (or the resolution) of the display)) of the first and second external electronic devices 102 and 104 communicating with the electronic device, and may manage (e.g., install, delete or update) an application operating in the external electronic device or a service (e.g., a call service or a messaging service) provided in the first and second external electronic devices 102 and 104.

The application 370 may include an application (e.g., a healthcare application for a mobile medical device) that is specified depending on the properties of the first and second external electronic devices 102 and 104. The application 370 may include an application received or downloaded from the server 106 or the first and second external electronic devices 102 and 104. The application 370 may include a preloaded application or a third party application that can be downloaded from the server. The names of the components of the illustrated program module 310 may vary depending on the type of the operating system.

At least a part of the program module 310 may be implemented by software, firmware, hardware or a combination thereof. At least a part of the program module 310 may be implemented (e.g., executed) by, for example, a processor (e.g., the processor 210). At least a part of the program module 310 may include, for example, a module, a program, a routine, an instruction set or a process, for performing one or more functions.

Figure 4A:
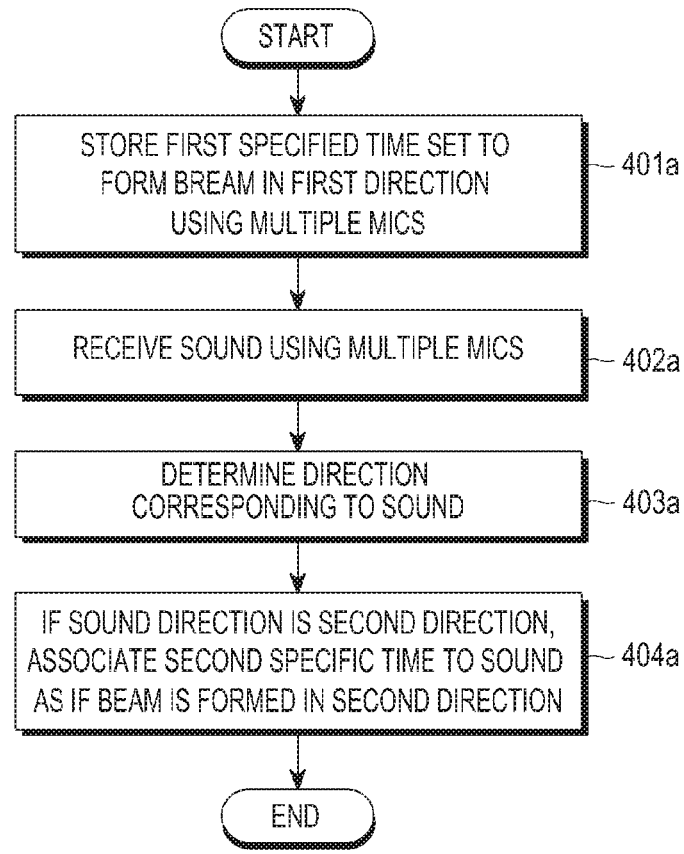
FIGS. 4A and 4B are flowcharts illustrating a beamforming control method of an electronic device, according to an embodiment of the present disclosure.
Figure 4B:
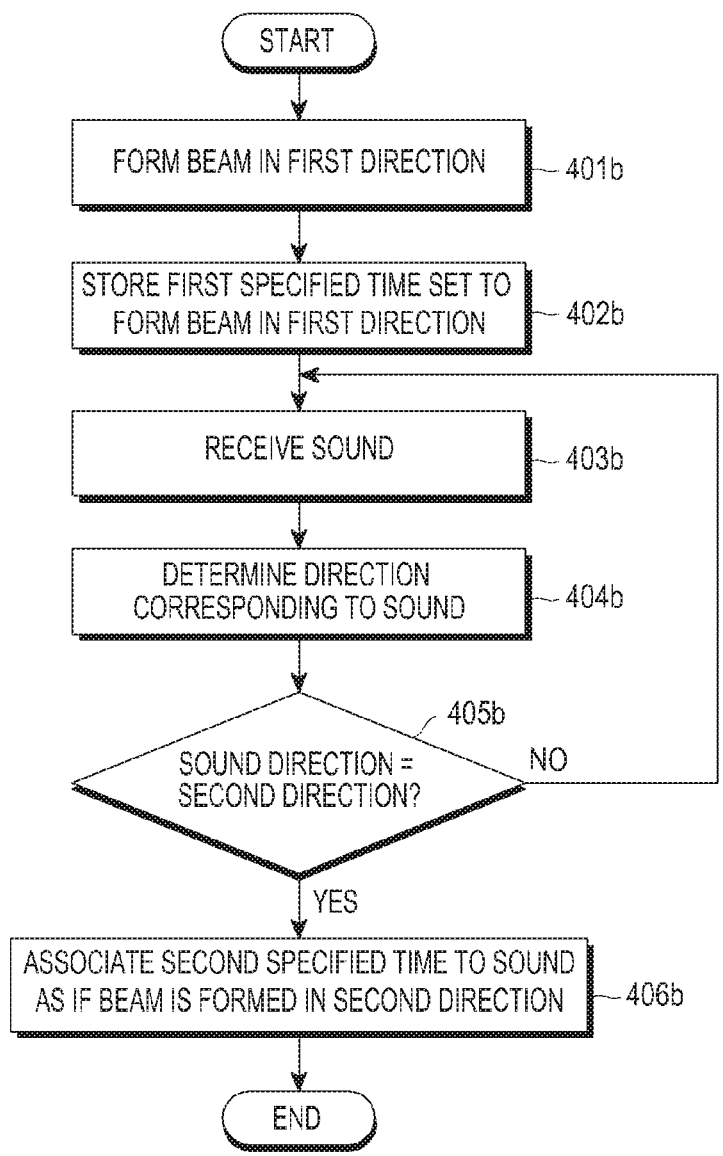

FIGS. 4A and 4B are flowcharts illustrating a beamforming control method of an electronic device, according to an embodiment of the present disclosure. For illustrative purposes, unless otherwise described, hereinafter it is assumed that the electronic device is the electronic device 101.

As shown in FIG. 4A, in step 401a, the electronic device 101 stores a first specified time to form a beam in a first direction using a plurality of microphones.

In step 402a, the electronic device 101 receives a sound using the plurality of microphones.

In step 403a, the electronic device 101 determines a direction corresponding to the received sound.

In step 404a, if the determined direction of the received sound is equivalent to a second direction, the electronic device 101 may associate a second specified time to the received sound as if a beam is formed in the second direction.

As shown in FIG. 4B, in step 401b, the electronic device 101 may form a beam in the first direction.

A beam may be formed by two or more microphones provided in the electronic device 101. For example, for the beamforming, the electronic device 101 may output a specific sound received in a predetermined direction among the sounds in all directions, which are received with a plurality of microphones, using an output unit (e.g., a speaker), or may store the received specific sound in a memory. Further, for a sound received in a direction other than the predetermined direction, the beamforming control method may block the output of the sound or exclude the sound from being stored in the memory.

The direction of beamforming may be the same as an azimuth of beamforming, a reception direction of beamforming, and a location of beamforming. In order to define the direction of beamforming, a specific point between two microphones may be defined as an origin. A straight line connected from the origin to a first microphone may be set as a reference line, and an angle made by the reference line and a straight line made by the location of beamforming and the origin may be set in the form of polar coordinate from 0° to 360°.

As one example, the electronic device 101 may output or store a sound received in a 0°-direction among the sounds that are received in all directions (directions between 0° and) 360° according to the beam that is formed in advance in the 0°-direction.

As another example, the electronic device 101 may output or store a sound received within a range from a 330°-direction to a 30°-direction among the sounds that are received in all directions according to the beam that is formed in advance in the 0°-direction.

In step 402b, if a beam is formed in the first direction, the electronic device 101 may store a first specified time to form a beam in the first direction.

The first specified time may include an array delay (or a reception time difference) of a plurality of microphones corresponding to the beam in the first direction, which is formed by the plurality of microphones. The term 'microphone array delay' may refer to a difference of the time at which a sound received in a specific direction is received with each microphone among the plurality of microphones. Herein, the microphone array delay may be used interchangeably with the reception time difference.

In step 403b, the first specified time may be stored, and the electronic device 101 may receive a sound in a specific direction. For example, the electronic device 101 may receive a sound in a specific direction (e.g., 90°-direction) within a range between 0° and 360°.

In step 404b, if a sound is received in a specific direction, the electronic device 101 may determine a reception direction of the sound that is received in the specific direction. One example of determining the reception direction may include direction-of-arrival (DOA) technology.

As one example of a method for determining a reception direction of a sound using the DOA technology, if a sound in a specific direction is received, the electronic device 101 may determine a reception direction of the sound based on the information relating a difference of the time at which the received sound is received with each microphone among the plurality of microphones. For example, the electronic device 101 may compare a first reception time at which the sound in the specific direction is received with a first microphone among the plurality of microphones, with a second reception time at which the sound in the specific direction is received with a second microphone, and determine a reception direction of the sound based on the difference between the first reception time and the second reception time. The memory 130 of the electronic device 101 may store associating data between the pre-measured (or predetermined) reception time difference value and the reception direction, and the electronic device 101 may search the associating data stored in the memory 130 for the specific direction (e.g., 90°-direction) corresponding to the reception time difference among all directions (directions between 0° and 360°) based on the reception time difference (e.g., 0 second) between the determined first and second reception times.

In step 405b, if the reception direction of the sound received in the specific direction is determined, the electronic device 101 may determine whether the determined reception direction is a direction (e.g., a second direction) different from the first direction that is the direction of the pre-formed beam.

If it is determined that the reception direction is not the second direction, the electronic device may again receive a sound in step 403b.

If it is determined that the reception direction is the second direction, the electronic device may associate a second specified time to the received sound as if the form is formed in the second direction, in step 406b.

The electronic device may obtain an array delay (e.g., a second microphone array delay) by which a sound whose direction is determined as the second direction is received with each microphone, obtain a difference between the obtained second microphone array delay and the stored first microphone array delay, and apply (or compensate) the obtained microphone array delay difference to the second microphone array delay that is a microphone array delay of the received sound.

For example, the electronic device 101 may perform a filtering operation for passing only the specific sound received in a preset beamforming direction among the sounds received in all directions, and remove the remaining sounds. During the filtering operation, in order to pass the sound received in a direction other than the beamforming direction, the electronic device 101 may change only the reception time difference (or the microphone array delay) of the sound input to the filter, without changing the structure of the filter, thereby processing not only the speaker's sound (or the talker's sound) received in a direction identical to the beamforming direction but also the speaker's sound received in a direction different from the beamforming direction, e.g., the sound received in the direction identical to the beamforming direction. In other words, the electronic device 101 may process the sound as if the beamforming direction is changed to a direction different from the beamforming direction that is the direction in which the sound is received. In this case, the electronic device 101 is not required to change the filter's value for the filtering operation in order to find a value having the lowest error rate. Accordingly, even though the speaker moves, there is no need to update the filter's value in real time. Further, the system configuration of the electronic device 101 may be further simplified, and the sound processing speed may be improved. Further, the power consumption of the electronic device 101 may be reduced, and the electronic device 101 may pass or remove the sound in the desired direction by compensating for the reception time delay of the input signal using the fixed beamformer.

Figure 5:
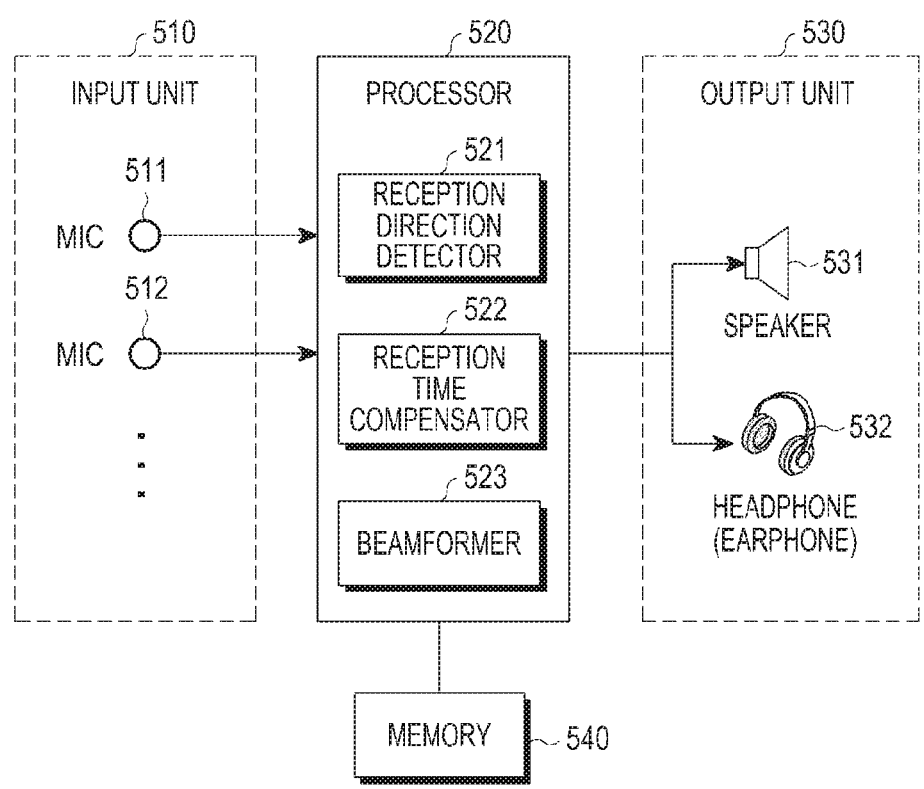
FIG. 5 is a diagram illustrating a processor including a reception time compensator in an electronic device, according to an embodiment of the present disclosure.

FIG. 5 is a diagram illustrating a processor including a reception time compensator in the electronic device 101, according to an embodiment of the present disclosure.

As shown in FIG. 5, the electronic device 101 may include, for example, an input unit 510 for receiving a sound, a processor 520 for compensating the received sound, an output unit 530 for outputting a sound according to the compensation result, and a memory 540 for storing data for compensating the sound.

The input unit 510 may include a plurality of microphones (MICs) that are disposed apart from each other in the electronic device 101, and the plurality of microphones may include two or more microphones including a first microphone 511 and a second microphone 512, though more MICs may be used. The first microphone 511 and the second microphone 512 may receive a sound in a specific direction at the same or different times. The first microphone 511 and the second microphone 512 may convert the received analog sound into a digital sound, and transmit the digital sound to the processor 520.

The processor 520 may include, for example, a reception direction detector 521, a reception time compensator 522 and a beamformer 523.

The reception direction detector 521 may determine a reception direction of the sound transmitted from the input unit 510. For example, the reception direction detector 521 may obtain information about the time at which the sound is received with each of the first microphone 511 and the second microphone 512, obtain a difference value between a first reception time of the first microphone 511 and a second reception time of the second microphone 512 based on the obtained reception time information, and determine a reception direction of the received sound based on the obtained reception time difference value. Further, the reception direction detector 521 may determine the reception direction of the sound based on the associating information between the reception time difference and the reception direction, which is stored in advance in the memory 540.

The processor 520 may determine based on the reception direction determined by the reception direction detector 521 whether the reception direction of the received sound is identical to the beamforming direction preset by the beamformer 523, and may process the received sound according to the determination results. If it is determined that the determined reception direction is identical to the beamforming direction, the processor 520 may transmit (or pass) the received sound to the output unit 530. In contrast, if it is determined that the determined reception direction is different from the beamforming direction, the processor 520 may compensate the received sound with a sound in the beamforming direction using the reception time compensator 522.

The reception time compensator 522 may compensate for the reception time difference of the sound, which is determined by the reception direction detector 521, with the reception time difference corresponding to the preset beamforming direction.

The beamformer 523 may transmit (or pass) the sound in the direction preset by the user to the output 530, and may block the transmission of the sound in a direction other than the preset direction.

The output unit 530 may output the sound transmitted from the processor 520 to a speaker 531 or a headphone (or earphone) 532. Accordingly, the user may listen not only to the sound received in the beamforming direction, but also to the sound that is received in a direction other than the preset beamforming direction as the user moves from the beamforming direction, without missing the sounds.

Figure 6A:
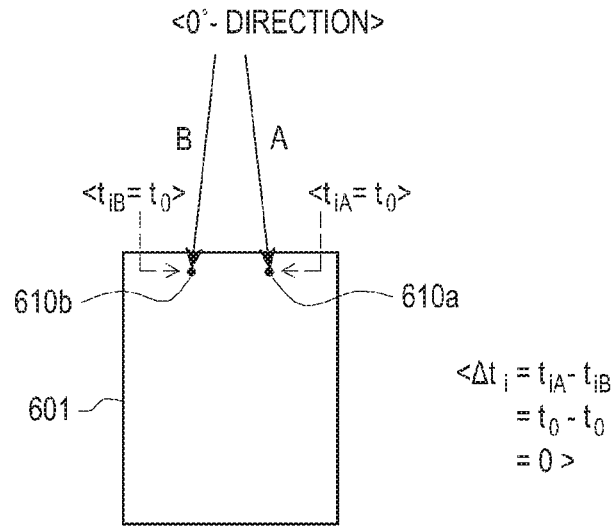
FIGS. 6A and 6B are diagrams illustrating a reception time difference that is based on a reception direction of a sound, according to an embodiment of the present disclosure.
Figure 6B:
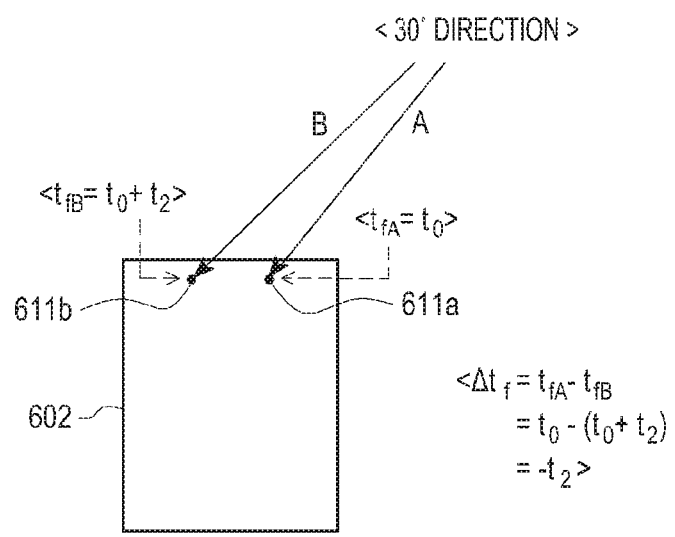

FIGS. 6A and 6B are diagrams illustrating a reception time difference that is based on a reception direction of a sound, according to an embodiment of the present disclosure.

Referring to FIG. 6A, an electronic device 601 may include a first microphone 610a and a second microphone 610b. The electronic device 601 may form a beam in a 0°-direction using the first microphone 610a and the second microphone 610b. If the sound is emitted in the 0°-direction, the first microphone 610a may receive a sound "A" at a time of $t_{iA}=t_o$ and the second microphone 610b may receive a sound "B" at a time of $t_{iB}=t_o$. In FIG. 6A, a difference $\Delta t_i$ in reception time between the first microphone 610a and the second microphone 610b, for the sound received in the 0°-direction, may be $t_{iA}-t_{iB}=t_o-t_o=0$.

Referring to FIG. 6B, an electronic device 602 may receive a sound in a 30°-direction using a first microphone 611a and a second microphone 611b. If the sound is mitted in the 30°-direction, the first microphone 611a may receive the sound "A" at a time of $t_{fA}=t_o$, and the second microphone 611b may receive a sound "B" at a time of $t_{fB}=t_o+t_2$. In FIG. 6B, a difference $\Delta t_f$ in reception time between the first microphone 611a and the second microphone 611b, for the sound received in the 30°-direction, may be $t_{fA}-t_{fB}=t_o-(t_o+t_2)=-t_2$.

Figure 6C:
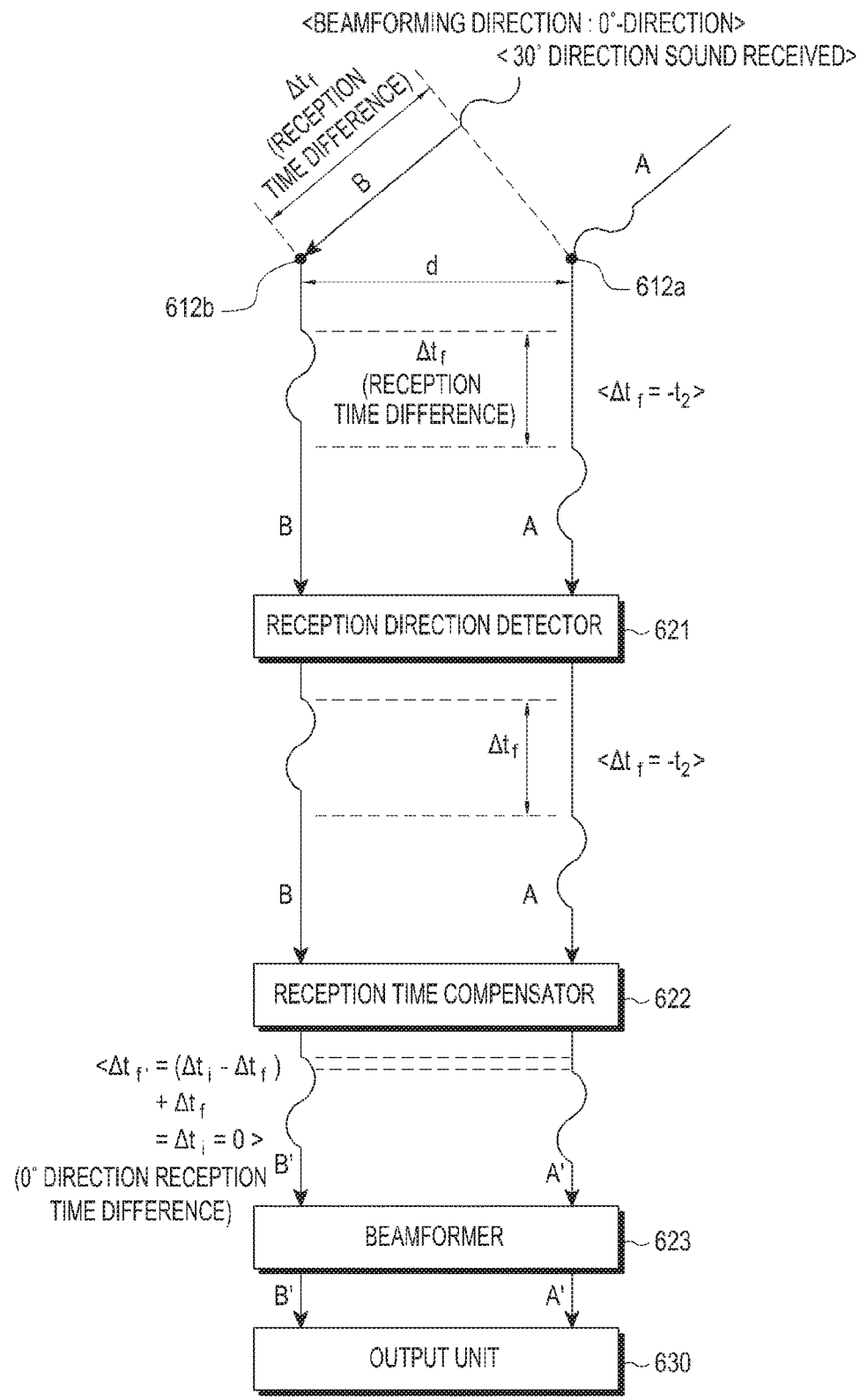
FIG. 6C is a diagram illustrating an operation of associating a specific microphone array delay to a sound, according to an embodiment of the present disclosure.

FIG. 6C is a diagram illustrating an operation of associating a specific microphone array delay to a sound, according to an embodiment of the present disclosure.

As shown in FIG. 6C, a beamformer 623 may form a beam in the 0°-direction using a first microphone 612a and a second microphone 612b. A gap (or distance) between the first microphone 612a and the second microphone 612b may be defined as "d". The beamformer 623 may store a first specified time (or a first reception time difference) set to form a beam in the 0°-direction using the first microphone 612a and the second microphone 612b. The first specified time $\Delta t_i$ may be calculated using an equation $\Delta t_i = d*\sin(0°)/c$ (where c is the speed of sound, e.g., 340 m/s).

If a sound is emitted in the 30°-direction while a beam is formed in the 0°-direction using the first microphone 612a and the second microphone 612b, the first microphone 612a of the electronic device may receive a sound "A" corresponding to the emitted sound, and the second microphone 612b may receive a sound "B" corresponding to the emitted sound.

A reception direction detector 621 may obtain a second microphone array delay (or a reception time difference of each microphone) based on the received sounds "A" and "B", determine a reception direction of the received sound based on the obtained second microphone array delay, and transmit the received sounds "A" and "B" to a reception time compensator 622. In a case where a sound is received in the 30°-direction, a reception time difference $\Delta t_f$ (or a specified time) between the sound "A" received by the first microphone 612a and the sound "B" received by the second microphone 612b may be $t_{fA}-t_{fB}=t_o-(t_o+t_2)=-t_2$.

The reception time compensator 622 may be configured to associate a second specified time to the sounds "A" and "B" transmitted from the reception direction detector 621. The second specified time may be a time difference between the pre-stored first microphone array delay and a second microphone array delay obtained by the first and second microphones 612a and 612b. The reception time compensator 622 may change the microphone array delay for the received sound to the first microphone array delay in the second microphone array delay. In other words, the microphone array delay $\Delta t_f'$ for the sound received in the 30°-direction may be changed (or compensated) from $t_{fA}-t_{fB}=t_o-(t_o+t_2)=-t_2$ (the second microphone array delay) to $\Delta t_i - \Delta t_f + \Delta t_f = \Delta t_i = 0$ (the first microphone array delay).

The reception time compensator 622 may transmit the sounds "A" and "B" whose reception time difference (or microphone array delay) is changed (or compensated), to the beamformer 623, and the beamformer 623 may transmit the transmitted sounds "A" and "B" to an output unit 630.

Where a preset beamforming direction is a specific angle (e.g., an angle at which the time difference has a value other than 0) other than 0° or 180°, in FIG. 6C, the reception time difference between the sounds "A" and "B" whose reception time difference is changed is greater than zero (0). However, in the case where the preset beamforming direction is 0°, the reception time difference may be zero (0) (or the reception times of the sounds "A" and "B" may be the same).

Figure 6D:
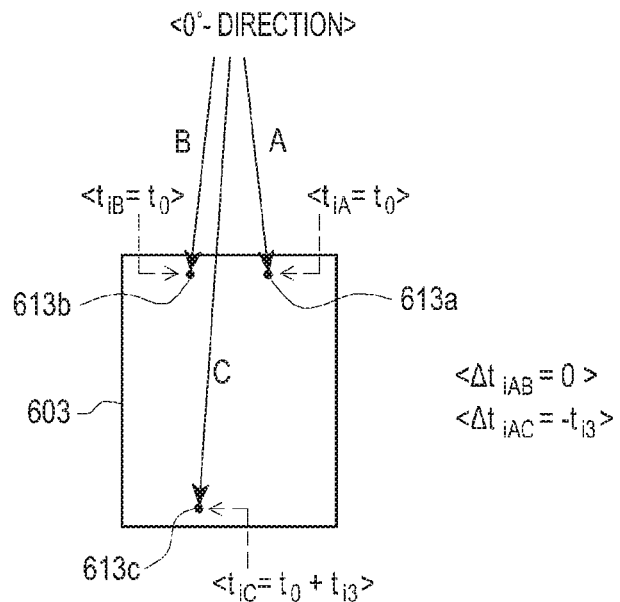
FIGS. 6D and 6E are diagrams illustrating a reception time difference that is based on a reception direction of a sound, according to an embodiment of the present disclosure.
Figure 6E:
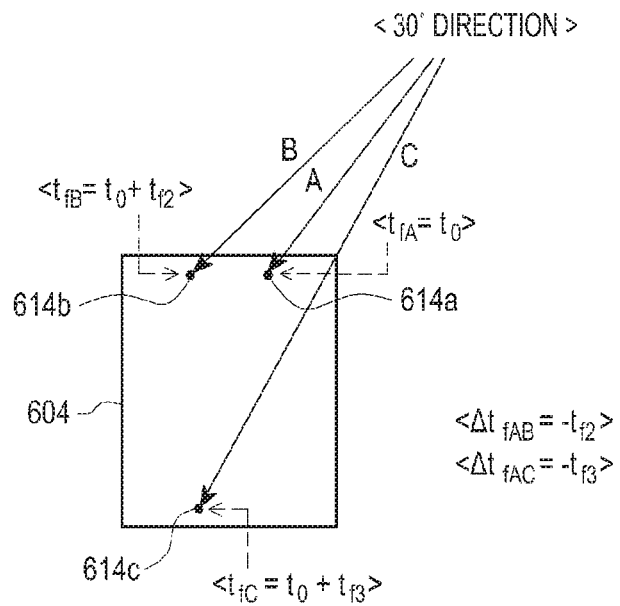

FIGS. 6D and 6E are diagrams illustrating a reception time difference that is based on a reception direction of a sound, according to an embodiment of the present disclosure.

Referring to FIG. 6D, an electronic device 603 may include a first microphone 613a, a second microphone 613b, and a third microphone 613c. The electronic device 603 may form a beam in a 0°-direction using the first microphone 613a, the second microphone 613b, and the third microphone 613c. If a sound is emitted in the 0°-direction, the first microphone 613a may receive a sound "A" at a time of $t_{iA}=t_o$, the second microphone 613b may receive a sound "B" at a time of $t_{iB}=t_o$, and the third microphone 613c may receive a sound "C" at a time of $t_{iC}=t_o+t_{i3}$. A difference $\Delta t_{iAB}$ in reception time between the first microphone 613a and the second microphone 613b, for the sound received in the 0°-direction, may be $t_{iA}-t_{iB}=t_o-t_o=0$, and a difference $\Delta t_{iAC}$ in reception time between the first microphone 613a and the third microphone 613c may be $t_{iA}-t_{iC}=t_o-(t_o+t_{i3})=-t_{i3}$.

Referring to FIG. 6E, an electronic device 604 may receive a sound in a 30°-direction using a first microphone 614a, a second microphone 614b and a third microphone 614c. If a sound is emitted in the 30°-direction, the first microphone 614a may receive a sound "A" at a time of $t_{fA}=t_o$, the second microphone 614b may receive a sound "B" at a time of $t_{fB}=t_o+t_{f2}$, and the third microphone 614c may receive a sound "C" at a time of $t_{fC}=t_o+t_{f3}$. A difference $\Delta t_{fAB}$ in reception time between the first microphone 614a and the second microphone 614b, for the sound received in the 30°-direction, may be $t_{fA}-t_{fB}=t_o-(t_o+t_{f2})=-t_{f2}$, and a difference $\Delta t_{AC}$ in reception time between the first microphone 614a and the third microphone 614c may be $t_{fA}-t_{fC}=t_o-(t_o+t_{f3})=-t_{f3}$.

Figure 6F:
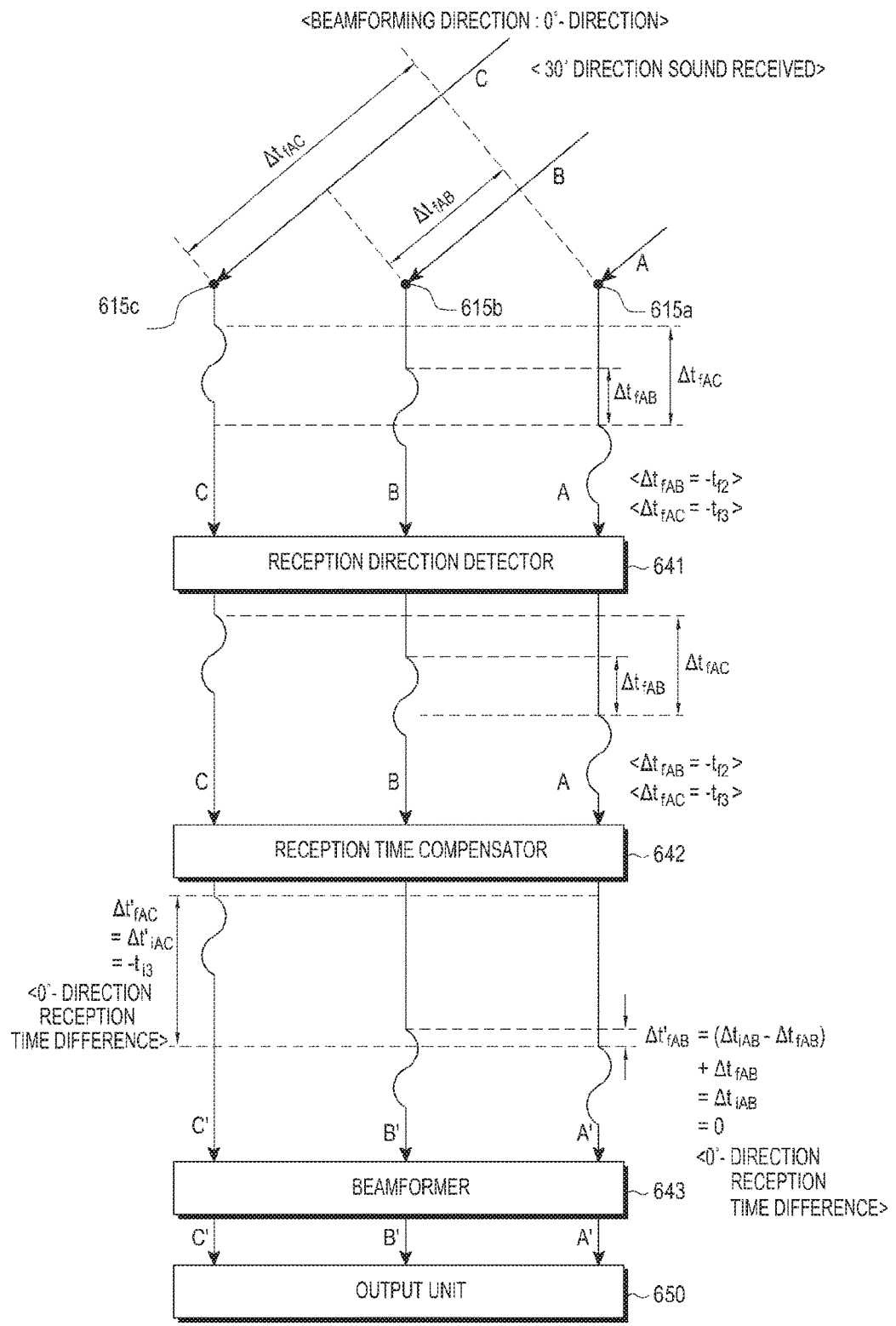
FIG. 6F is a diagram illustrating an operation of associating a specific microphone array delay to a sound, according to an embodiment of the present disclosure.

FIG. 6F is a diagram illustrating an operation of associating a specific microphone array delay to a sound, according to an embodiment of the present disclosure.

As shown in FIG. 6F, a beamformer 643 may form a beam in a 0°-direction using a first microphone 615a, a second microphone 615b and a third microphone 615c. The beamformer 643 may store a first specified time (or a first microphone array delay) set to form a beam in the 0°-direction using the first microphone 615a, the second microphone 615b and the third microphone 615c. The first specified time may include a reception time difference $\Delta t_{iAB}$ between the first microphone 615a and the second microphone 615b, and a reception time difference $\Delta t_{iAC}$ between the first microphone 615a and the third microphone 615c. The reception time difference $\Delta t_{iAB}$ between the first microphone 615a and the second microphone 615b, and the reception time difference $\Delta t_{iAC}$ between the first microphone 615a and the third microphone 615c may be determined in a similar way to the description made with reference to FIG. 6C. For example, the reception time difference $\Delta t_{iAB}$ between the first microphone 615a and the second microphone 615b, and the reception time difference $\Delta t_{iAC}$ between the first microphone 615a and the third microphone 615c may be determined based on the distance between the first microphone 615a and the second microphone 615b, and the direction of the preset beam between the first microphone 615a and the third microphone 615c.

If a sound is emitted in the 30°-direction while a beam is formed in the 0°-direction using the first microphone 615a, the second microphone 615b and the third microphone 615c, the first microphone 615a of the electronic device may receive a sound "A" corresponding to the emitted sound, the second microphone 615b may receive a sound "B" corresponding to the emitted sound, and the third microphone 613c may receive a sound "C" at a time $t_{iC}=t_o+t_{i3}$.

A reception direction detector 641 may obtain a second microphone array delay (or a reception time difference of each microphone) based on the received sounds "A", "B" and "C", determine a reception direction of the received sounds based on the obtained second microphone array delay, and provide the received sounds "A", "B" and "C" to a reception time compensator 642. The second microphone array delay may include a reception time difference (or a reception time difference between the sounds "A" and "B") between the first microphone 615a and the second microphone 615b, and a reception time difference (or a reception time difference between the sounds "A" and "C") between the first microphone 615a and the third microphone 615c. If a sound is received in the 30°-direction, the microphone array delay may include a reception time difference ($\Delta t_{fAB}=t_{fA}-t_{fB}=t_o-(t_o+t_{f2})=-t_{f2}$) between the first microphone 615a and the second microphone 615b, and a reception time difference ($\Delta t_{fAC}=t_{fA}-t_{fC}=t_o-(t_o+t_{f3})=-t_{f3}$) between the first microphone 615a and the third microphone 615c.

The reception time compensator 642 may be configured to associate a second specified time to the sounds "A", "B" and "C" transmitted from the reception direction detector 641. The second specified time may be a time difference between the pre-stored first microphone array delay and a second microphone array delay obtained by the reception time compensator 642. The reception time compensator 642 may change the microphone array delay for the received sounds from the second microphone array delay to the first microphone array delay.

The reception time compensator 642 may change the reception time difference of the received sounds to $\Delta t_{fAB}'=0$ by associating (or adding) a difference between the first microphone array delay $\Delta t_{iAB}$ and the second microphone array delay $\Delta t_{fAB}$, to the reception time difference $\Delta t_{fAB}$ between the sounds "A" and "B" received in the 30°-direction. As a result, the reception time difference $\Delta t_{fAB}'$ between the sounds "A" and "B" may be changed (or compensated) from $-t_{f2}$ (the second microphone array delay) to 0 (the first microphone array delay).

Similarly, the reception time difference $\Delta t_{fAC}'$ between the sounds "A" and "C" may be changed (or compensated) from $-t_{f3}$ (the microphone array delay (the second microphone array delay) corresponding to the 30°-direction) to $-t_{i3}$ (the microphone array delay (the first microphone array delay) corresponding to the 0°-direction).

The reception time compensator 642 may transmit the sounds "A", "B" and "C" whose reception time difference (or microphone array delay) is changed (or compensated), to the beamformer 643, and the beamformer 643 may transmit the transmitted sounds "A", "B" and "C" to the output unit 650.

Where a preset beamforming direction is a specific angle (e.g., an angle at which the time difference has a value other than 0) other than 0° or 180°, in FIG. 6F, the reception time difference between the sounds "A", "B" and "C" whose reception time difference is changed is greater than zero (0). However, in the case where the preset beamforming direction is 0°, the reception time difference may be zero (0) (or the reception times of the sounds "A", "B" and "C" may be the same).

Figure 7A:
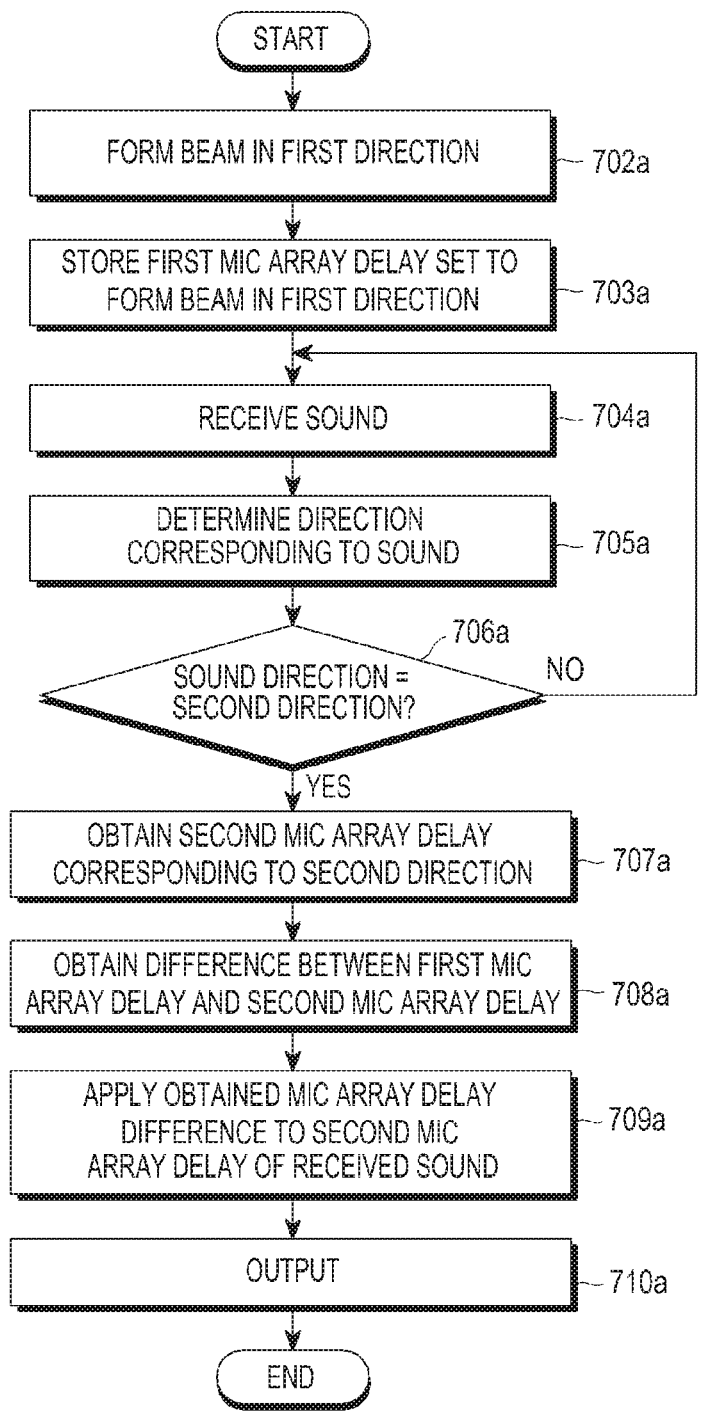
FIG. 7A is a flowchart illustrating a beamforming control method of an electronic device, according to an embodiment of the present disclosure.

FIG. 7A is a flowchart illustrating a beamforming control method of the electronic device 101 according to an embodiment of the present disclosure.

Referring to FIG. 7A, in step 702a, the electronic device 101 (or the electronic device 601) may form a beam in a first direction.

In step 703a, after forming the beam in the first direction, the electronic device 101 may store a first microphone array delay to form a beam in the first direction.

The electronic device 101 may receive a sound in step 704a, and determine a direction corresponding to the received sound in step 705a.

If the direction of the received sound is identical to the first direction that is the direction of the pre-formed beam, the electronic device 101 may receive the sound until a sound in a second direction is received, in step 706a.

If the direction of the received sound is the second direction, which is different from the first direction that is the direction of the pre-formed beam, the electronic device 101 may obtain a second microphone array delay corresponding to the second direction in step 707a.

In step 708a, upon obtaining the second microphone array delay, the electronic device 101 may obtain a difference between the first microphone array delay and the second microphone array delay.

In step 709a, upon obtaining the difference between the microphone array delays, the electronic device 101 may apply (or add) the difference between the microphone array delays to the second microphone array delay of the received sound.

In step 710a, the electronic device may output the compensated sound (or the obtained sound) to which the microphone array delay difference is applied.

Figure 7B:
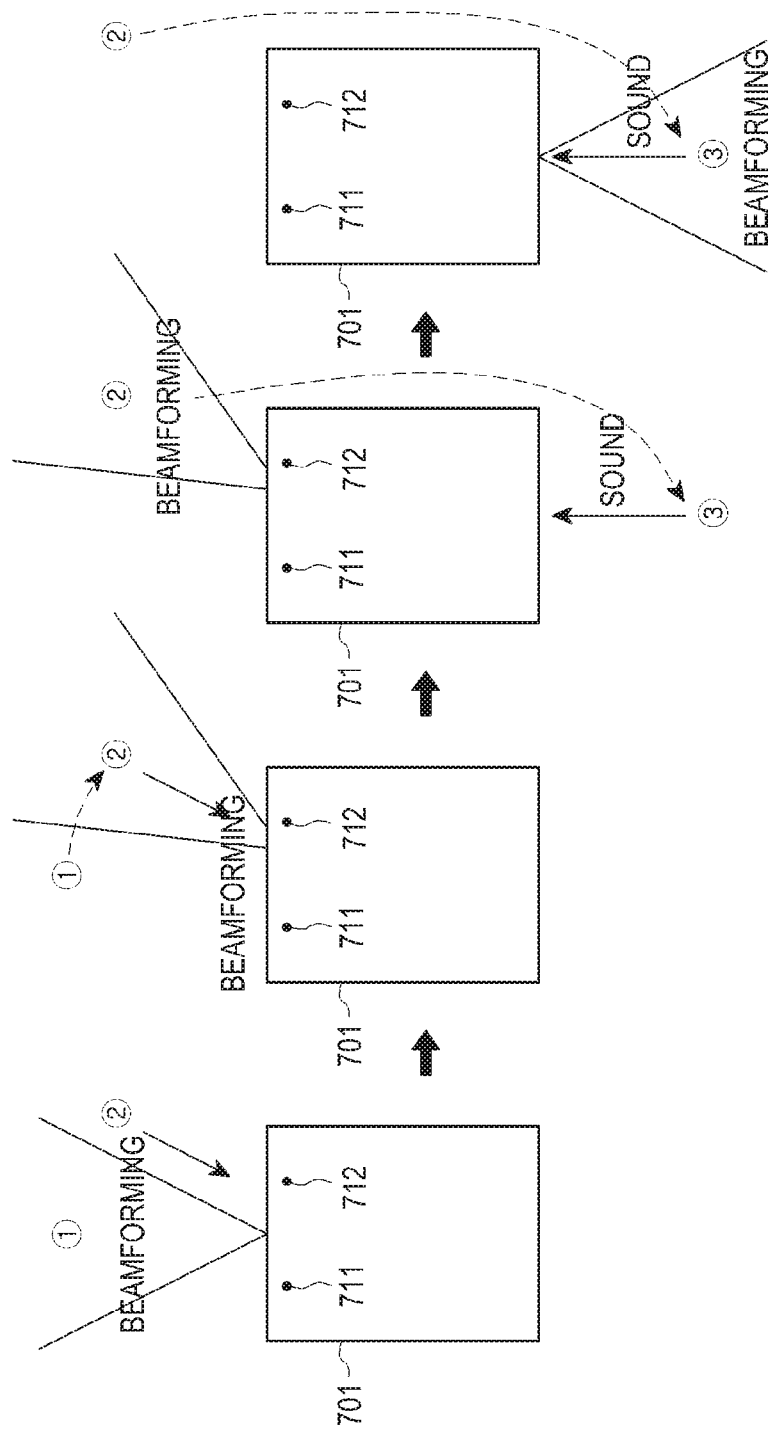
FIGS. 7B and 7C are diagrams illustrating a method for receiving a sound emitted from a moving speaker using a fixed beamformer, according to an embodiment of the present disclosure.
Figure 7C:
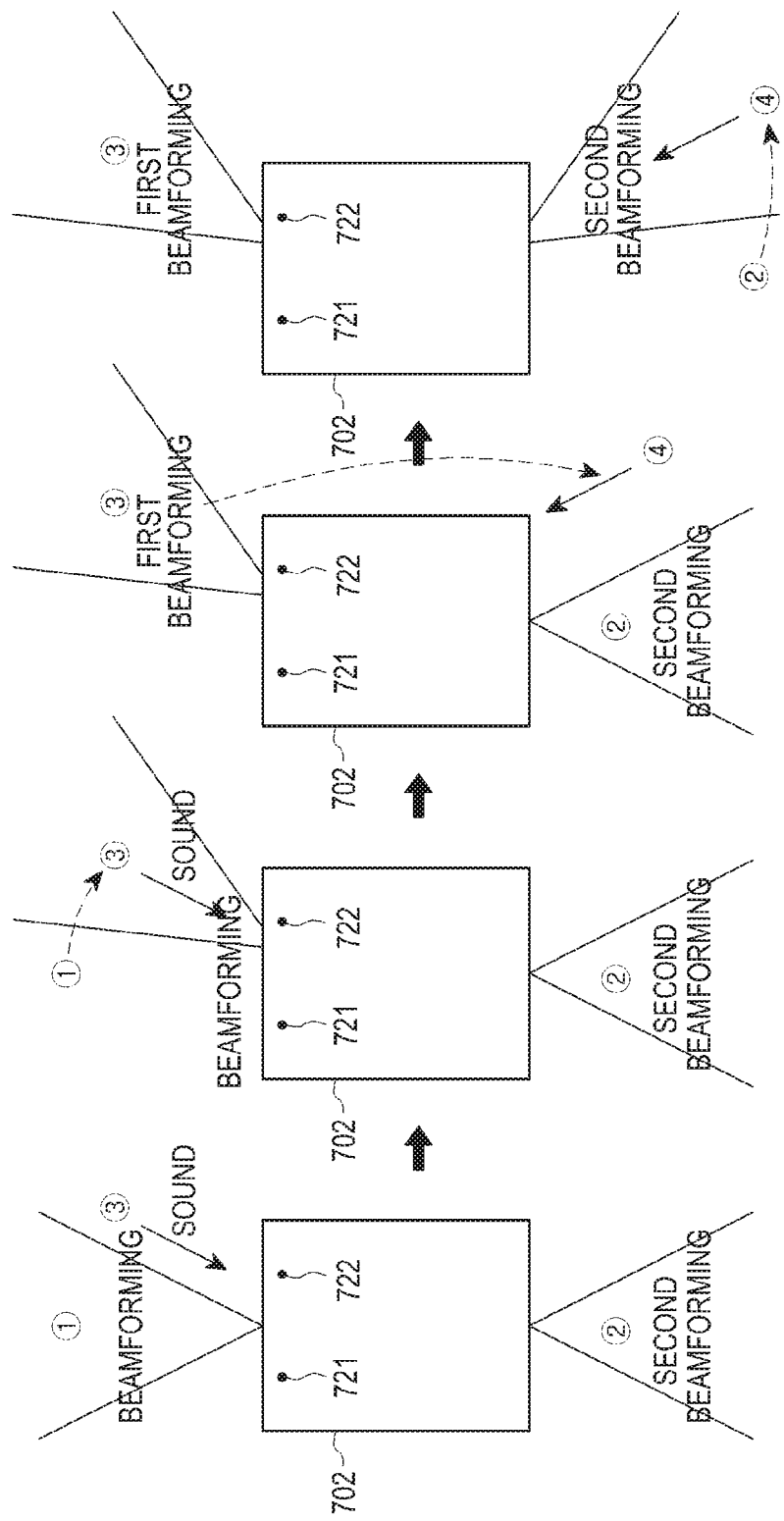

FIGS. 7B and 7C are diagrams illustrating a method for receiving a sound emitted from a moving speaker using a fixed beamformer, according to an embodiment of the present disclosure.

Referring to FIG. 7B, an electronic device 701 may set beamforming in a "①" direction using a first microphone 711 and a second microphone 712.

If the speaker moves in a "②" direction and then a sound is received in the "②" direction while the beamforming is set in the "①" direction, the electronic device 701 may apply a difference between a first microphone array delay corresponding to the "①" direction and a second microphone array delay corresponding to the "②" direction to the sound received in the "②" direction, as if the direction of beamforming is changed from the "①" direction to the "②" direction.

If a sound is received in a "③" direction after the speaker moves from the "②" direction to the "③" direction, the electronic device 701 may apply a difference between a first microphone array delay corresponding to the "②" direction and a second microphone array delay corresponding to the "③" direction to the sound received in the "③" direction, as if the direction of beamforming is changed from the "②" direction to the "③" direction.

Referring to FIG. 7C, an electronic device 702 may set first beamforming in a "①" direction and second beamforming in a "②" direction using a first microphone 721 and a second microphone 722, and the number of beamforming directions may be three or more, but it is not limited thereto. In this case, the electronic device 702 may further store two or more microphone array delays set to form a beam in at least two directions. In FIG. 7C, the electronic device 702 may store a third microphone array delay for setting the first beamforming in the "①" direction and a fourth microphone array delay for setting the second beamforming in the "②" direction.

If the speaker moves in the "③" direction and then a sound is received in the "③" direction while the first beamforming in the "①" direction and the second beamforming in the "②" direction are set, the electronic device 702 may apply a difference between a third microphone array delay corresponding to the "①" direction and a fifth microphone array delay corresponding to the "③" direction to the sound received in the "③" direction, as if the direction of the first beamforming, which is close to the "③" direction, is changed to the "③" direction.

If a sound is received in a "④" direction after the speaker moves from the "③" direction to the "④" direction, the electronic device 702 may apply a difference between a fourth microphone array delay corresponding to the "②" direction and a sixth microphone array delay corresponding to the "④" direction to the sound received in the "④" direction, as if the direction of second beamforming set in the "②" direction, which is close to the "④" direction, is changed to the "④" direction.

Figure 7D:
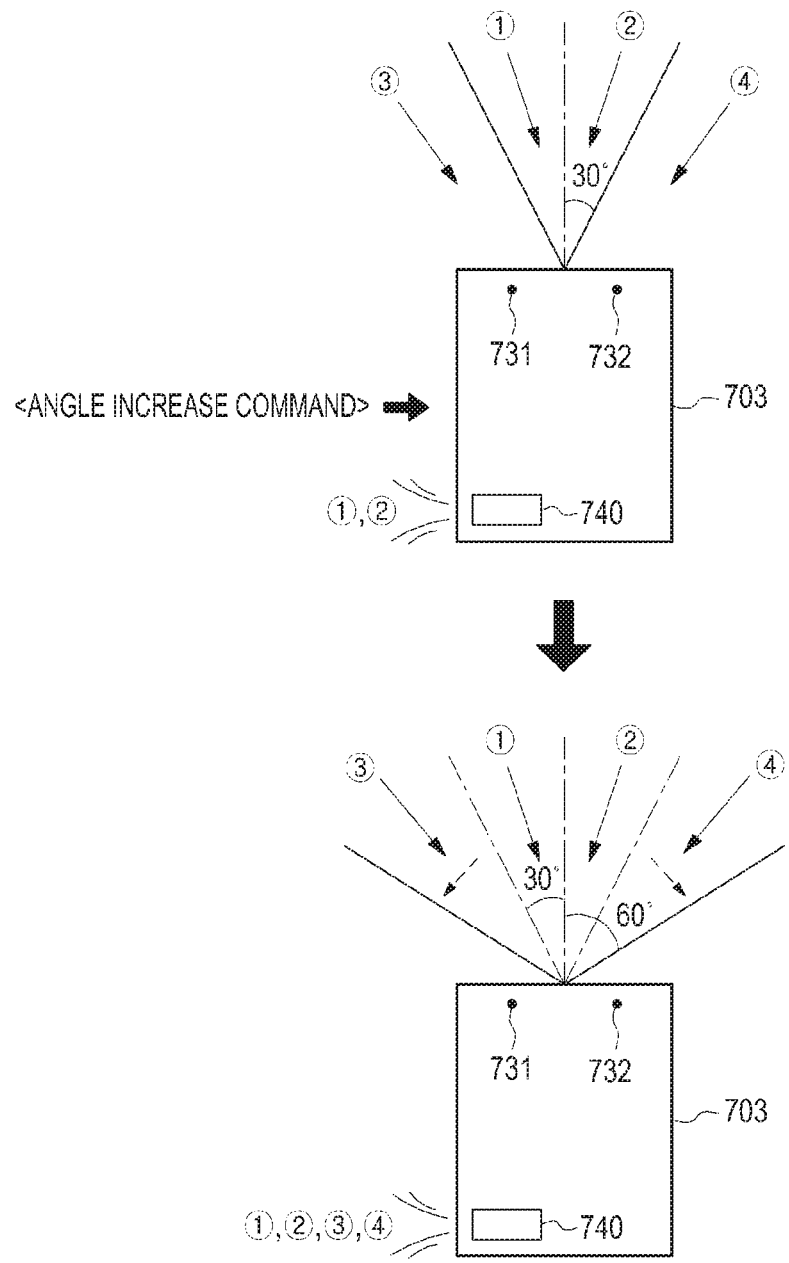
FIG. 7D is a diagram illustrating an operation of changing a range of beamforming, according to an embodiment of the present disclosure.

FIG. 7D is a diagram illustrating an operation of changing a range of beamforming, according to an embodiment of the present disclosure.

The electronic device 101 or the electronic device 703 may change a range (or an angle) of a pre-formed beam, hereinafter described with respect to electronic device 703. The electronic device 703 may include an input unit for receiving a change command for the range of a beam.

Referring to FIG. 7D, the electronic device 703 may set, as a beamforming range, a range that is defined by 30° in the counterclockwise direction and 30° in the clockwise direction on the basis of a specific direction (e.g., 0°-direction) using a first microphone 731 and a second microphone 732. If the beamforming range is set, the electronic device 703 may output, using an output unit 740, only the sounds received in the ① and ② directions belonging to the beamforming range, among the sounds received in the ①, ②, ③ and ④ directions.

Upon receiving an angle increase command, the electronic device 703 may increase the range of beamforming to a range that is defined by 60° in the counterclockwise direction and 60° in the clockwise direction on the basis of a specific direction, in response to the received angle increase command. If the beamforming range is changed, the electronic device 703 may output, using the output unit 740, not only the sounds received in the 1 and ② directions belonging to the existing beamforming range given before the beamforming range is increased, but also the sounds received in the ③ and ④ directions belonging to the new beamforming range given after the beamforming range is increased, among the sounds received in the ①, ②, ③ and ④ directions.

The electronic device 703 may change the range of beamforming, and the range of beamforming may be defined as a range (e.g., a direction in which a sound received in the center direction is received at a magnitude of 3 dB) that is defined by a specific angle in the clockwise and counterclockwise directions on the basis of the preset center direction of beamforming.

Figure 8:
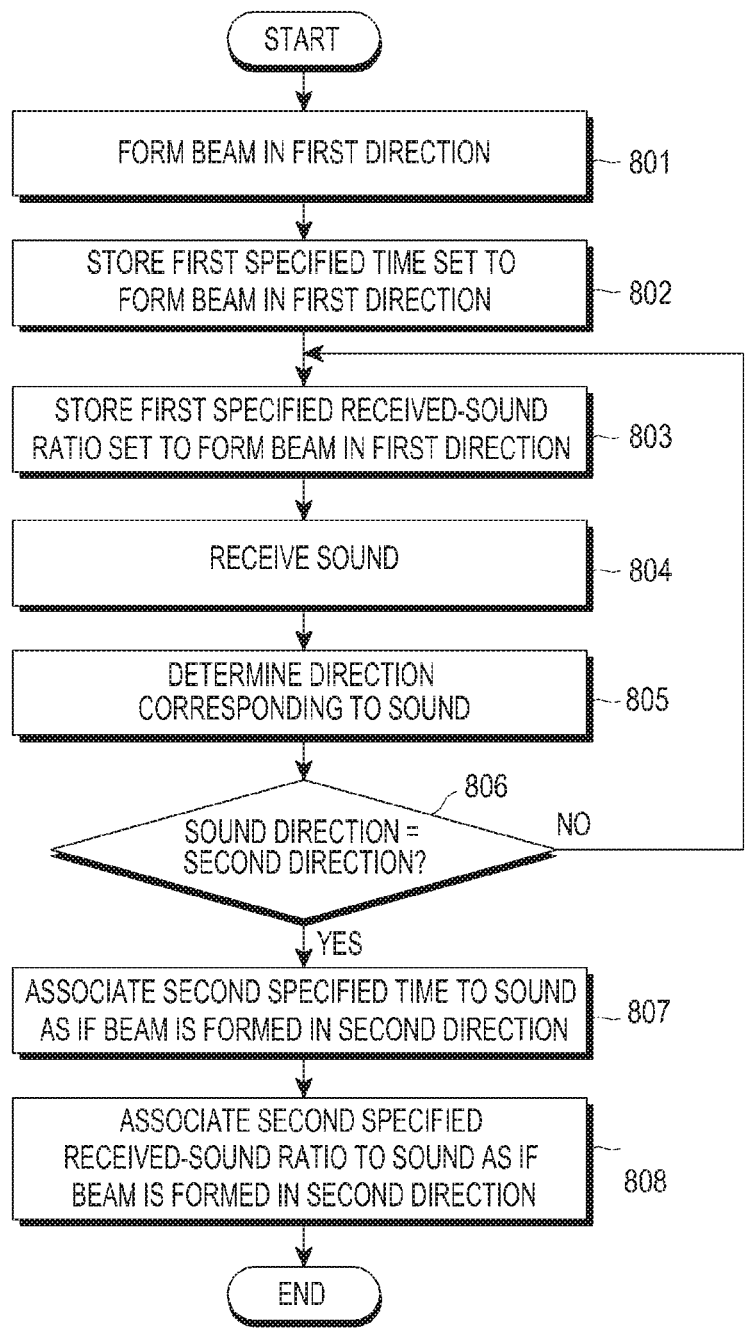
FIG. 8 is a flowchart illustrating a beamforming control method of an electronic device, according to an embodiment of the present disclosure.

FIG. 8 is a flowchart illustrating a beamforming control method of the electronic device 101, according to an embodiment of the present disclosure.

Referring to FIG. 8, in step 801, the electronic device 101 may form a beam in a first direction.

In step 802, if the beam is formed in the first direction, the electronic device 101 may store a first specified time set to form a beam in the first direction.

In step 803, if the first specified time is stored, the electronic device 101 may further store a first specified received-sound ratio set to form a beam in the first direction.

The first specified received-sound ratio may refer to a ratio of a reception magnitude of a sound received by each microphone among a plurality of microphones.

In step 804, if the first specified time is stored, the electronic device 101 may receive a sound in a specific direction.

In step 805, if a sound is received in a specific direction, the electronic device 101 may determine a reception direction of the sound received in the specific direction.

In step 806, if the reception direction of the sound received in the specific direction is determined, the electronic device 101 may determine whether the determined reception direction is identical to a second direction different from the first direction that is a direction of a pre-formed beam.

If it is determined that the reception direction is the same direction as the first direction that is the direction of the pre-formed beam, then the electronic device 101 may receive a sound again in step 804.

If it is determined that the reception direction is the second direction different from the first direction that is the direction of the pre-formed beam, the electronic device 101 may associate a second specified time to the received sound, as if a beam is formed in the second direction, in step 807.

In step 808, if the second specified time is associated to the received sound as if a beam is formed in the second direction, the electronic device 101 may associate a second specified received-sound ratio to the received sound as if a beam is formed in the second direction.

The electronic device 101 may obtain an array received-sound ratio (i.e., a second microphone array received-sound ratio) at which the sound whose direction is determined as the second direction is received with each microphone, obtain a ratio (or a difference) between the obtained second microphone array received-sound ratio and the pre-stored first microphone array received-sound ratio, and apply (or compensate) the obtained ratio (or difference) of the microphone array received-sound ratio to the second microphone array received-sound ratio that is the microphone array received-sound ratio of the received sound.

Figure 9:
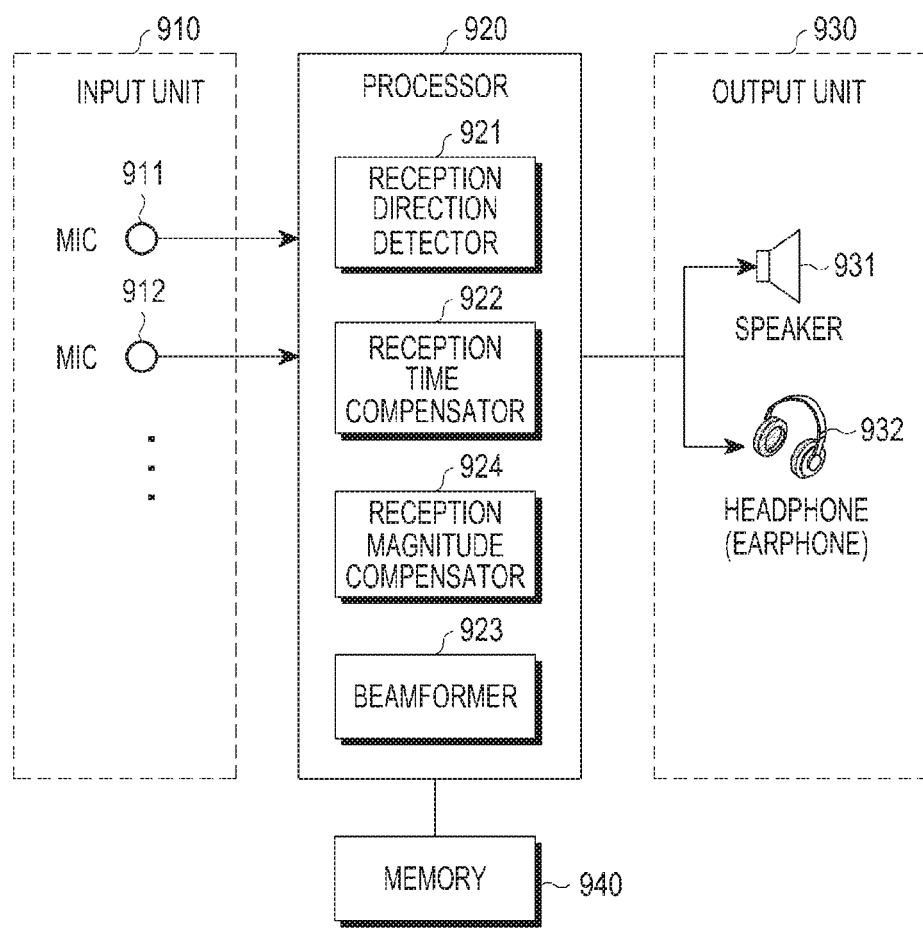
FIG. 9 is a diagram illustrating a processor including a reception time compensator and a reception magnitude compensator in an electronic device, according to an embodiment of the present disclosure.

FIG. 9 is a diagram illustrating illustrates a processor including a reception time compensator and a reception magnitude compensator in the electronic device 101, according to an embodiment of the present disclosure.

Referring to FIG. 9, the electronic device 101 may include, for example, an input unit 910, a processor 920, an output unit 930 and a memory 940.

The input unit 910 may include a first microphone 911 and a second microphone 912, and the first and second microphones 911 and 912 may convert a received sound into a digital signal using analog-to-digital conversion (ADC), and transmit the digital signal to the processor 920.

The processor 920 may include a reception direction detector 921 for obtaining a reception direction of a received sound, a reception time compensator 922 for compensating for the determined reception time difference of the sound based on the reception time difference of the beamforming direction, a beamformer 923 for forming a beam, and a reception magnitude compensator 924.

The reception magnitude compensator 924 compensates the sound whose reception time difference is compensated for by the reception time compensator 922, as if a beam is formed in a second direction, or so that the sound may become the same as the signal in the beamforming direction. For example, the reception magnitude compensator 924 may obtain information about a sound magnitude at the time the sound is received by each microphone, obtain a ratio (or a difference) of the magnitude of the sound received by each microphone, and compensate for the obtained sound magnitude ratio (or difference) based on the predetermined sound magnitude ratio (difference) of the predetermined beamforming direction.

The reception direction detector 921 and the reception time compensator 922 may operate based on associating data between the reception time difference and the reception direction, which is stored in the memory 940, and the reception magnitude compensator 924 may operate based on associating data between the reception magnitude difference and the reception direction, which is stored in the memory 940.

TABLE 1

| Reception direction (unit: °) | MIC reception time difference (unit: ms) |
|---|---|
| 0 | 1.8 |
| 10 | 1.6 |
| 20 | 1.4 |
| 30 | 1.2 |
| 40 | 1.0 |
| 50 | 0.8 |
| 60 | 0.6 |
| 70 | 0.4 |
| 80 | 0.2 |
| 90 | 0.0 |
| 100 | −0.2 |
| 110 | −0.4 |
| 120 | −0.6 |
| 130 | −0.8 |
| 140 | −1.0 |
| 150 | −1.2 |
| 160 | −1.4 |
| 170 | −1.6 |
| 180 | −1.8 |
| 190 | −1.6 |
| 200 | −1.4 |
| 210 | −1.2 |
| 220 | −1.0 |
| 230 | −0.8 |
| 240 | −0.6 |
| 250 | −0.4 |
| 260 | −0.2 |
| 270 | 0.0 |
| 280 | 0.2 |
| 290 | 0.4 |
| 300 | 0.6 |
| 310 | 0.8 |
| 320 | 1.0 |
| 330 | 1.2 |
| 340 | 1.4 |
| 350 | 1.6 |

Table 1 shows an associating relationship between a reception direction and a reception time difference of a sound, according to an embodiment of the present disclosure.

As shown in Table 1, a plurality of microphones (it is assumed in Table 1 that two microphones are provided) of an electronic device may receive a sound in a specific direction at the same or different times, and a microphone array delay difference of each microphone may be determined in advance depending on the predetermined state of the electronic device, such as the alignment state of multiple microphones provided in the electronic device, the size state of the microphones, or the housing state of the electronic device.

As one example of a microphone array delay according to the reception direction, if a sound is received at the electronic device in a 10°-direction, a microphone array delay difference between a first microphone and a second microphone of the electronic device may be 1.6 seconds. As another example, if a sound is received at the electronic device in a 90°-direction, a microphone array delay difference between the first microphone and the second microphone of the electronic device may be 0 seconds.

Further, as one example of a reception direction according to the microphone array delay, if it is determined that each microphone array delay difference of the sound received at the electronic device is 0.8 seconds, the electronic device may obtain an angle 50° or 310° corresponding to the 0.8 seconds, as a reception direction of the sound.

Although the associating relationship between the microphone array delay difference and the reception direction shown in Table 1 may be determined differently depending on the type of the electronic device, the same electronic devices may have the same associating relationship at all times.

When a sound is received by each microphone of the electronic device, a magnitude of the sound received by each microphone may represent a different value depending on the reception direction, and a difference between a magnitude of the sound received by the first microphone and a magnitude of the sound received by the second microphone among a plurality of microphones may have a constant value for each reception direction.

As in the case where the reception time difference is used, the electronic device may obtain a magnitude difference of the sound to each microphone, and compensate for the obtained magnitude difference of the sound as a sound magnitude difference for a case where a sound is to be received in the predetermined beamforming direction.

The processor 920 may transmit, to the output unit 930, the sound compensated by each of the reception time compensator 922 and the reception magnitude compensator 924, and the output unit 930 may output the compensated sound transmitted from the processor 920 using a speaker 931 or a headphone (or earphone) 932.

Figure 10A:
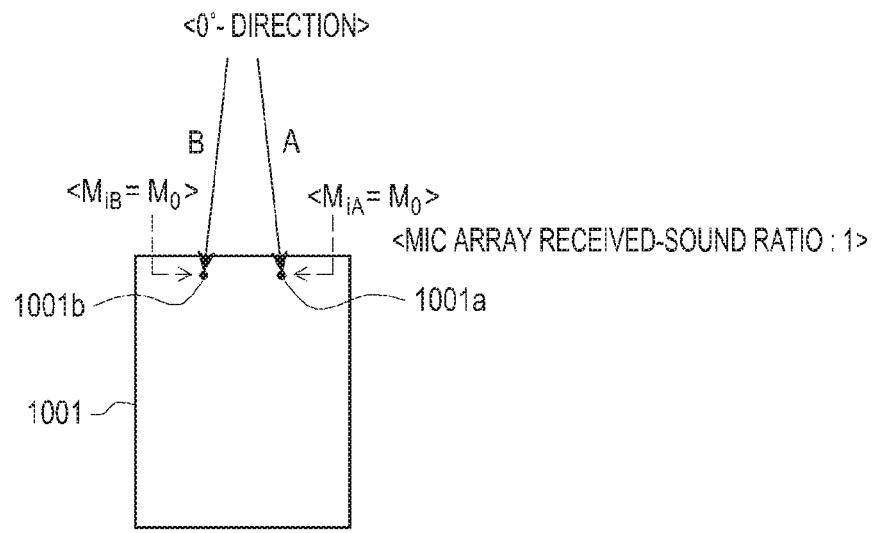
FIGS. 10A and 10B are diagrams illustrating a reception time difference and a reception magnitude ratio, which are based on a reception direction of a sound, according to an embodiment of the present disclosure.
Figure 10B:
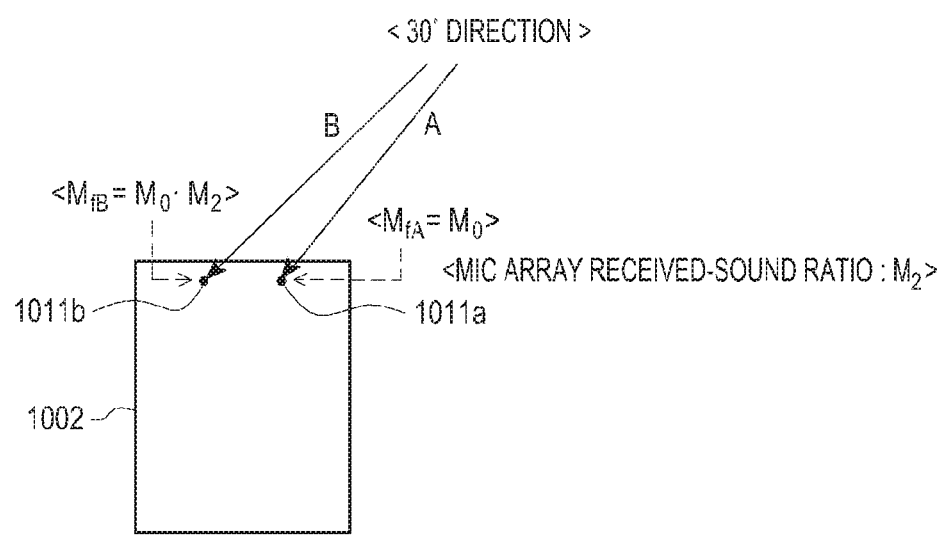

FIGS. 10A and 10B are diagrams illustrating a reception time difference and a reception magnitude ratio, which are based on a reception direction of a sound, according to an embodiment of the present disclosure.

As shown in FIG. 10A, an electronic device 1001 may form a beam in a 0°-direction using a first microphone 1010a and a second microphone 1010b. If a sound is emitted in the 0°-direction, the first microphone 1010a may receive a sound "A" at a magnitude of $M_{iA}=M_o$, and the second microphone 1010b may receive a sound "B" at a magnitude of $M_{iB}=M_o$. In the case of FIG. 10A, a reception magnitude ratio $M_{iB}/M_{iA}$ between the first microphone 1010a and the second microphone 1010b for the sound received in the 0°-direction may be $M_{iB}/M_{iA}=M_o/M_o=1$.

As shown in FIG. 10B, an electronic device 1002 may receive a sound in a 30°-direction using a first microphone 1011a and a second microphone 1011b. If a sound is emitted in the 30°-direction, the first microphone 1011a may receive a sound "A" at a magnitude $M_{fA}=M_o$, and the second microphone 1011b may receive a sound "B" at a magnitude $M_{fB}=M_o*M_2$. In the case of FIG. 10B, a reception magnitude ratio $M_{fB}/M_{fA}$ between the first microphone 1011a and second microphone 1011b for the sound received in the 30°-direction may be $M_{fB}/M_{fA}=(M_o*M_2)/M_o=M_2$.

Figure 10C:
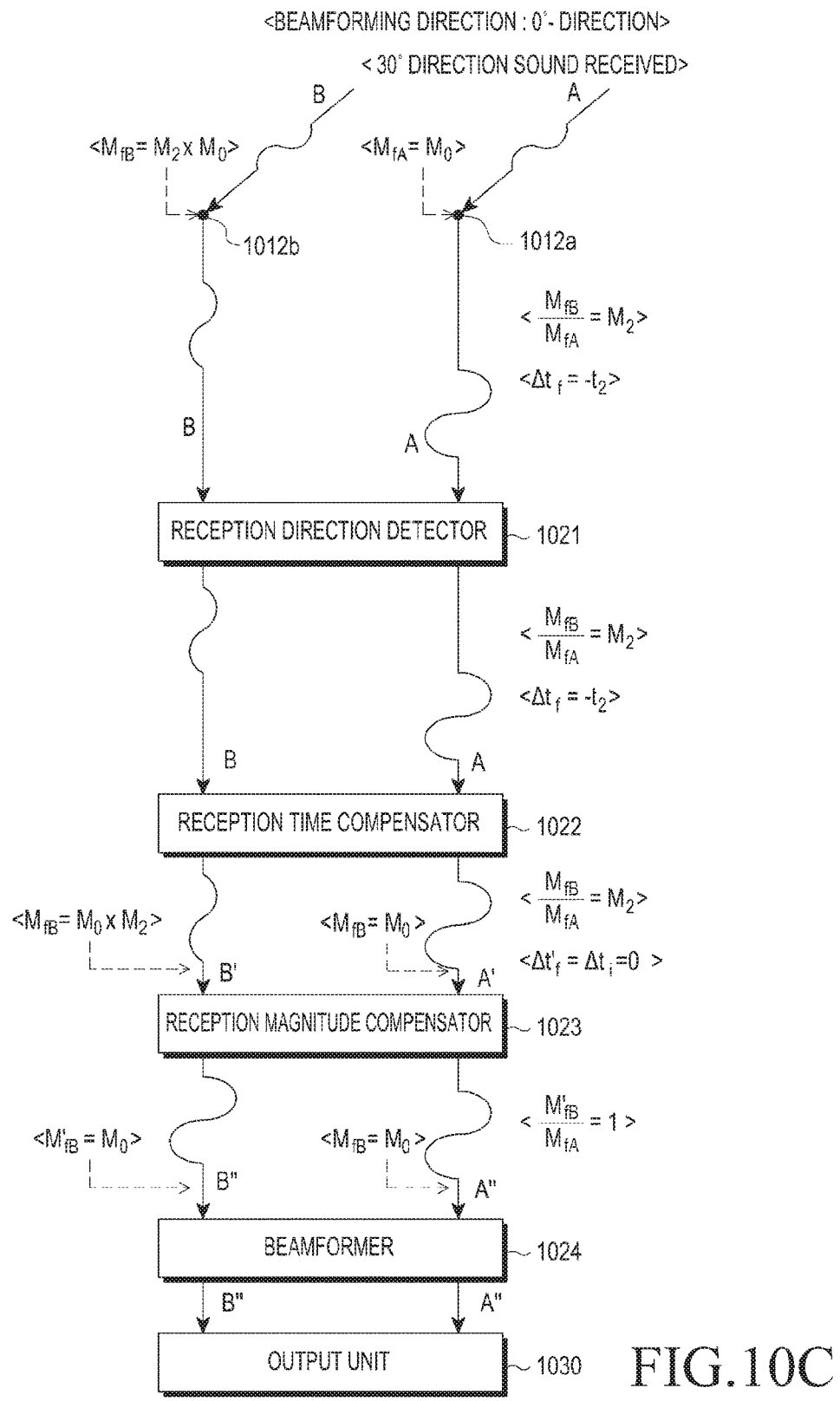
FIG. 10C is a diagram illustrating an operation of associating a specific microphone array received-sound ratio to a sound, according to an embodiment of the present disclosure.

FIG. 10C is a diagram illustrating an operation of associating a specific microphone array received-sound ratio to a sound, according to an embodiment of the present disclosure.

As shown in FIG. 10C, a beamformer 1024 may form a beam in a 0°-direction using a first microphone 1012a and a second microphone 1012b. The beamformer 1024 may store a first specified time (or a first reception time difference) set to form a beam in the 0°-direction using the first microphone 1012a and the second microphone 1012b. The first specified time $\Delta t_i$ may be calculated using an equation of $\Delta t_i = d*\sin(0°)/c$ (where c is the speed of sound, e.g., 340 m/s).

The beamformer 1024 may store a first specified received-sound ratio (or a first reception magnitude ratio) set to form a beam in the 0°-direction using the first microphone 1012a and the second microphone 1012b. The first specified received-sound ratio $M_{iB}/M_{iA}$ may be $M_{iB}/M_{iA}=M_o/M_o=1$.

If a sound is emitted in a 30°-direction while the beam is formed in the 0°-direction using the first microphone 1012a and the second microphone 1012b, the first microphone 1012a of the electronic device may receive a sound "A" corresponding to the emitted sound at a magnitude of $M_{fA}(=M_o)$, and the second microphone 1012b may receive a sound "B" corresponding to the emitted sound at a magnitude of $M_{iB}(=M_o*M_2)$.

A reception direction detector 1021 may obtain a second microphone array delay (or a reception time difference of each microphone) based on the received sounds "A" and "B", determine a reception direction of the received sounds based on the obtained second microphone array delay, and transmit the received sounds "A" and "B" to a reception time compensator 1022. If a sound is received in the 30°-direction, a reception time difference $\Delta t_f$ (or a specified time) between the sound "A" received by the first microphone 1012a and the sound "B" received by the second microphone 1012b may be $t_{fA}-t_{fB}=t_o-(t_o+t_2)=-t_2$.

The reception time compensator 1022 may be configured to associate a second specified time to the sounds "A" and "B" transmitted from the reception direction detector 1021. The second specified time may be a time difference between the pre-stored first microphone array delay and the second microphone array delay obtained by the reception time compensator 1022. The reception time compensator 1022 may change the microphone array delay for the received sound from the second microphone array delay to the first microphone array delay. In other words, a microphone array delay $\Delta t_f'$ for the sound received in the 30°-direction may be changed (or compensated) from $t_{fA}-t_{fB}=t_o-(t_o+t_2)=-t_2$ (or a second microphone array delay) to $\Delta t_i-\Delta t_f+\Delta t_f=\Delta t_i=0$ (or a first microphone array delay).

The reception time compensator 1022 may transmit, to a reception magnitude compensator 1023, the sounds "A" and "B" whose reception time difference (or microphone array delay) is changed (or compensated).

The reception magnitude compensator 1023 may be configured to associate a second specified received-sound ratio to the sounds "A" and "B" whose reception times are compensated by the reception time compensator 1022. The second specified received-sound ratio may be a time difference between the pre-stored first microphone array received-sound ratio and the second microphone array received-sound ratio obtained by the first and second microphones 1012a and 1012b. The reception magnitude compensator 1023 may change the microphone array received-sound ratio for the received sound from the second microphone array received-sound ratio to the first microphone array received-sound ratio. In other words, a microphone array received-sound ratio $M_{fB}'/M_{fA}'$ for the sounds received in 30°-direction may be changed (or compensated) from $M_{fB}/M_{fA}=(M_o*M_2)/M_o=M_2$ (or a second microphone array received-sound ratio) to $M_{iB}/M_{iA}=M_o/M_o=1$ (or a first microphone array received-sound ratio).

TABLE 2

| Reception direction (unit: °) | MIC reception magnitude difference (unit: dB) |
| --- | --- |
| 0 | 3.6 |
| 10 | 3.2 |
| 20 | 2.8 |
| 30 | 2.4 |
| 40 | 2.0 |
| 50 | 1.6 |
| 60 | 1.2 |
| 70 | 0.8 |
| 80 | 0.4 |
| 90 | 0.0 |
| 100 | −0.4 |
| 110 | −0.8 |
| 120 | −1.2 |
| 130 | −1.6 |
| 140 | −2.0 |
| 150 | −2.4 |
| 160 | −2.8 |
| 170 | −3.2 |
| 180 | −3.6 |
| 190 | −3.2 |
| 200 | −2.8 |
| 210 | −2.4 |
| 220 | −2.0 |
| 230 | −1.6 |
| 240 | −1.2 |
| 250 | −0.8 |
| 260 | −0.4 |
| 270 | 0 |
| 280 | 0.4 |
| 290 | 0.8 |
| 300 | 1.2 |
| 310 | 1.6 |
| 320 | 2.0 |
| 330 | 2.4 |
| 340 | 2.8 |
| 350 | 3.2 |

Table 2 shows an associating relationship between a reception direction and a microphone array received-sound ratio difference value of a sound, according to an embodiment of the present disclosure.

Referring to Table 2, multiple microphones of an electronic device may receive a sound in a specific direction at the same or different magnitudes, and a microphone array received-sound ratio difference of each microphone may be determined in advance depending on the predetermined state of the electronic device, such as the alignment state of multiple microphones provided in the electronic device, the size state of the microphones, or the housing state of the electronic device.

As one example of an associating relationship of the microphone array received-sound ratio according to the reception direction, if a sound is received at the electronic device in a 30°-direction, a microphone array received-sound ratio difference between a first microphone and a second microphone of the electronic device may be 2.4 dB. As another example, if a sound is received at the electronic device in a 100°-direction, a microphone array received-sound ratio difference between a first microphone and a second microphone of the electronic device may be −0.4 dB.

As one example of a reception direction according to the microphone array received-sound ratio, if it is determined that a difference in each microphone array received-sound ratio of the sound received at the electronic device is 0.8 dB, the electronic device may obtain an angle 70° or 290° corresponding to 0.8 dB, as a reception direction of the sound.

The reception magnitude compensator 1023 may transmit, to the beamformer 1024, the sounds "A" and "B" whose reception time difference (or microphone array delay) and reception magnitude difference (or microphone array received-sound ratio) are changed (or compensated), and the beamformer 1024 may transmit the transmitted sounds "A" and "B" to an output unit 1030.

Figure 11:
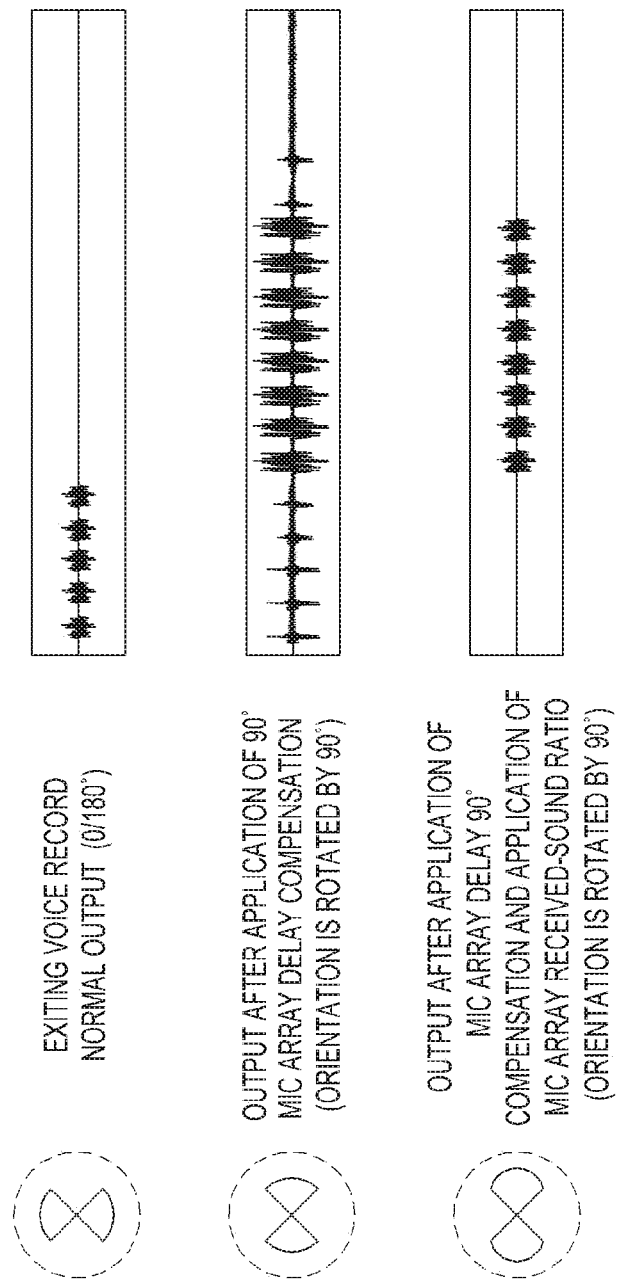
FIG. 11 is a diagram illustrating waveforms of a sound output by a beamforming control method, according to an embodiment of the present disclosure.

FIG. 11 is a diagram illustrating a sound output by a beamforming control method, according to an embodiment of the present disclosure.

A first (i.e., a top) graph in FIG. 11 shows a waveform of a sound that is output when the sound is received in a 0° or 180°-direction while the beamforming direction is set to 0° or 180°.

A second (i.e., a middle) graph in FIG. 11 shows a waveform of a sound that is output when compensation of a microphone array delay of sound is applied in a case where the speaker has moved to a 90°-direction while the beamforming direction is fixed to 0° or 180°.

A third (i.e., a bottom) graph in FIG. 11 shows a waveform of a sound that is output when compensation of a microphone array received-sound ratio is applied in addition to the application of the compensation of the microphone array delay of sound in a case where the speaker has moved to a 90°-direction while the beamforming direction is fixed. Comparing the second and third graphs in FIG. 11, it may be noted that compared with a case (a case of the second graph) where only the microphone array delay is simply compensated, a case (a case of the third graph) where the microphone array delay and the microphone array received-sound ratio are both compensated, shows the greater effect in compensating the sound reception direction to the existing beamforming direction.

Figure 12:
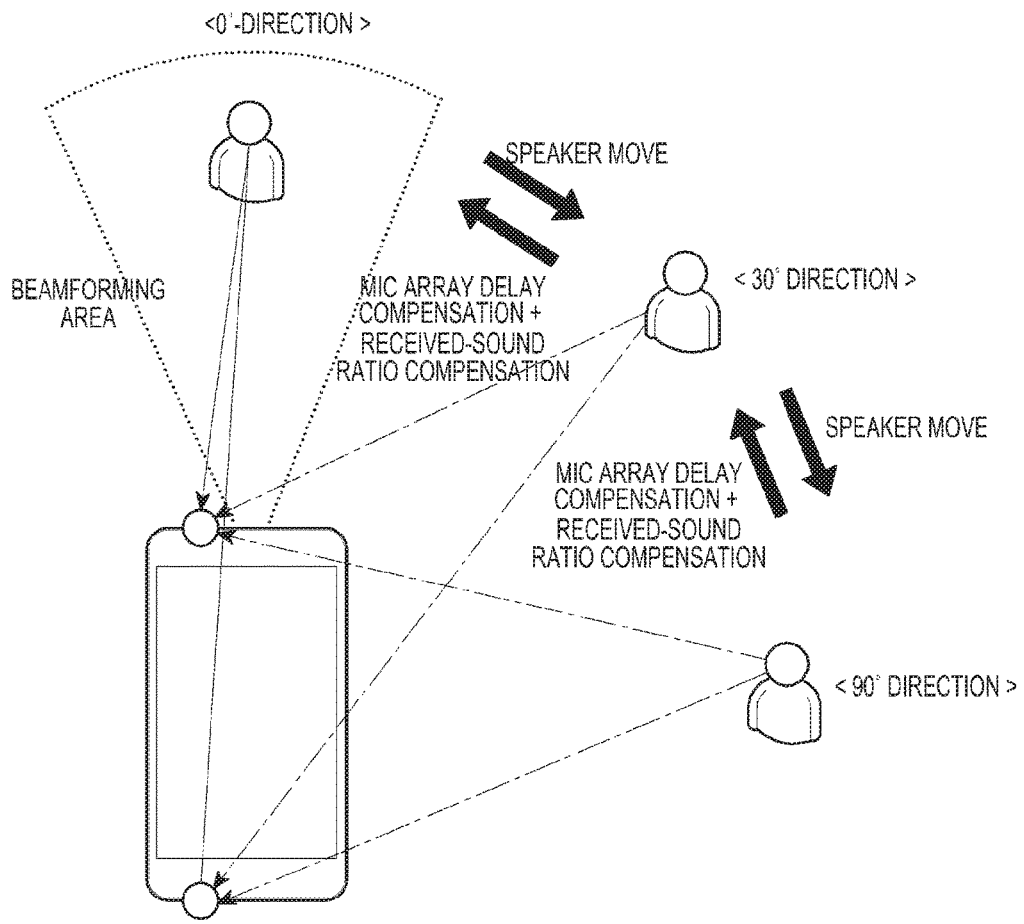
FIG. 12 is a diagram illustrating a beamforming control method, according to an embodiment of the present disclosure.

FIG. 12 is a diagram illustrating a beamforming control method, according to an embodiment of the present disclosure.

Referring to FIG. 12, if a reception direction of a sound that the speaker delivers to the electronic device is changed to a direction other than the beamforming direction as the speaker located in a 0°-direction moves to a 30°-direction while a beam is formed in the 0°-direction, the electronic device may compensate a microphone sound reception time, compensate a magnitude of the received sound, and change the sound currently received in the 30°-direction to a sound to be received in the 0°-direction, as if a beam is formed in the 30°-direction for the sound received in the 30°-direction, in response to the movement of the speaker and the change of the reception direction.

Similarly, if the speaker moves from the 30°-direction to the 90°-direction, the electronic device may compensate the sound reception time and the sound magnitude of the microphone for the sound that is delivered by the speaker in the 90°-direction, to change the sound currently received in the 90°-direction to the sound to be received in the 0°-direction that is the beamforming direction, as if a beam is formed in the 90°-direction.

Figure 13:
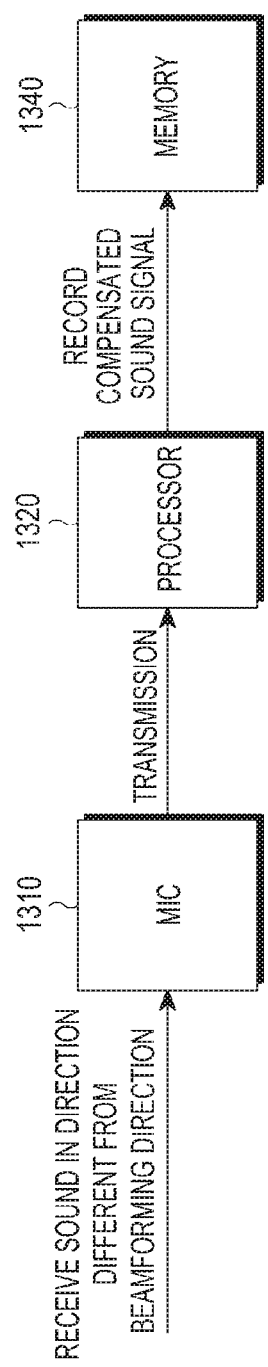
FIG. 13 is a diagram illustrating an operation of recording a compensated sound, according to an embodiment of the present disclosure.

FIG. 13 is a diagram illustrating an operation of recording a compensated sound, according to an embodiment of the present disclosure.

Referring to FIG. 13, while beamforming is set, a microphone 1310 may receive a sound in a direction different from the beamforming direction; two or more microphones may be provided.

In one embodiment, if a sound in a direction different from the beamforming direction is received, the microphone 1310 may transmit the received sound to a processor 1320.

Upon receiving the sound, the processor 1320 may compensate the received sound as if a beam is formed in the sound-received direction. The compensation method is the same as described with reference to FIGS. 4A-12, so a detailed description thereof will be omitted.

In one embodiment, if the received sound is compensated as if the beam is formed in the sound-received direction, the processor 1320 may record the compensated sound in a memory 1340 to store it in the form of sound data.

Figure 14A:
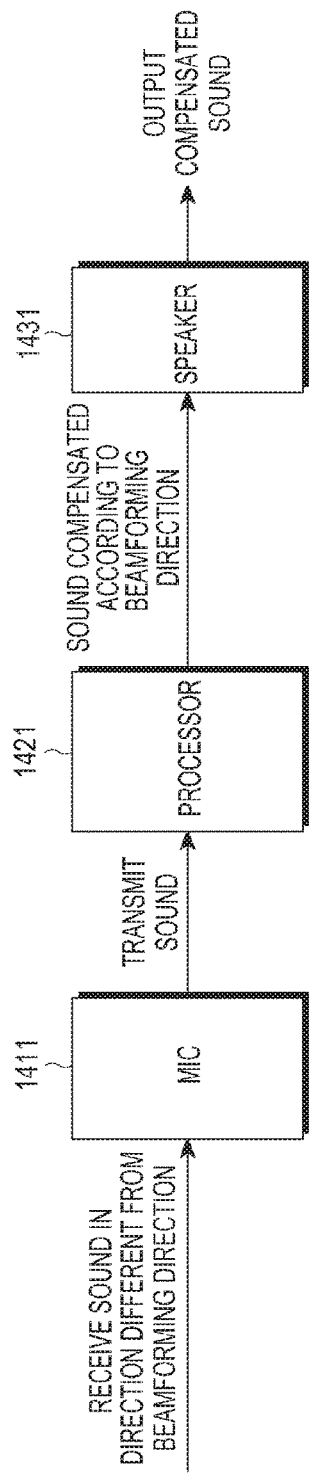
FIGS. 14A and 14B are diagrams illustrating operations of outputting compensated sounds using speakers, according to an embodiment of the present disclosure.
Figure 14B:
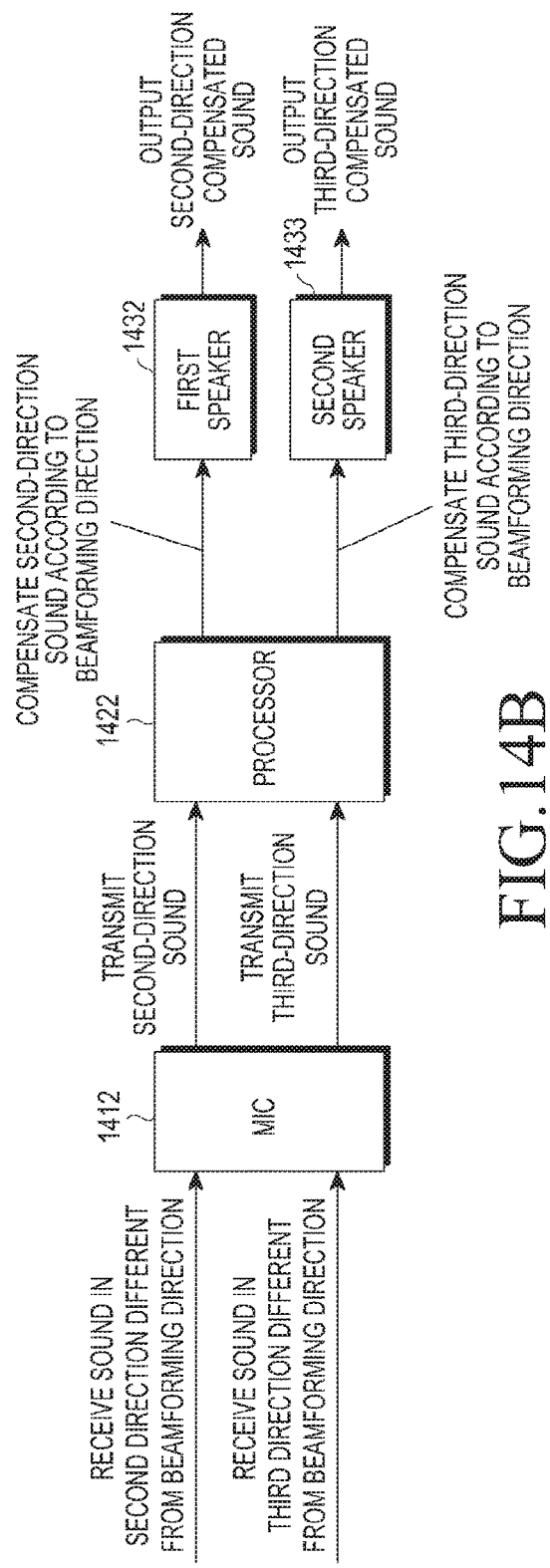

FIGS. 14A and 14B are diagrams illustrating operations of outputting compensated sounds using speakers, according to an embodiment of the present disclosure.

Referring to FIG. 14A, if a sound in a direction different from the beamforming direction is received, a microphone 1411 may transmit the received sound to a processor 1421. If the sound is transmitted, the processor 1421 may compensate the received sound according to the beamforming direction. If the received sound is compensated, the processor 1421 may transmit the compensated sound to a speaker 1431. If the compensated sound is transmitted, the speaker 1431 may output the compensated sound.

Referring to FIG. 14B, a microphone 1412 may receive a sound in a plurality of directions. The microphone 1412 may receive both of a sound in a second direction different from the beamforming direction and a sound in a third direction different from the beamforming direction. If the second-direction sound and the third-direction sound are received, the microphone 1412 may transmit multiple sounds to a processor 1422.

The processor 1422 may compensate the received second-direction sound according to the direction of the pre-formed beam, and compensate the received third-direction sound according to the direction of the pre-formed beam. The processor 1422 may compensate the second-direction sound by associating a preset second specified time to the second-direction sound as if a beam is formed in the second direction, and may compensate the third-direction sound by associating a preset third specified time to the third-direction sound as if a beam is formed in the third direction.

If the second-direction sound and the third-direction sound are compensated, the processor 1422 may transmit the compensated second-direction sound to a first speaker 1432, and transmit the compensated third-direction sound to a second speaker 1433.

The first speaker 1432 may output the transmitted second-direction compensated sound, and the second speaker 1433 may output the transmitted third-direction compensated sound. As a result, the electronic device may output the speaker's sound received in a direction different from the beamforming direction using a separate speaker corresponding to the sound-received direction.

FIGS. 15A to 15D are diagrams illustrating operations of transmitting and receiving a compensated sound to/from other electronic devices using a communication module, according to an embodiment of the present disclosure.

According to various embodiments of the present disclosure, an electronic device may include a microphone 1511, a processor 1521 and a communication module 1531.

Referring to FIG. 15A, the microphone 1511 of the electronic device may receive a sound in a direction different from the beamforming direction, and transmit the received sound to the processor 1521.

If the sound is transmitted, the processor 1521 may compensate the received sound by associating a preset specified time to the received sound as if a beam is formed in the sound-received direction, and transmit the compensated sound to the communication module 1531.

The communication module 1531 may be configured to transmit the transmitted compensated sound to a first electronic device 1541 or a second electronic device 1542, which is an electronic device that is different from the electronic device.

Referring to FIG. 15B, a microphone 1512 of an electronic device may receive a sound in a direction different from the beamforming direction, and transmit the received sound to a processor 1522. The processor 1522 may be configured to connect a call to a communication terminal from the electronic device using a communication module 1532, and transmit the compensated sound to communication terminal. The processor 1522 may transmit a call connection request signal to a first electronic device 1543 that is the communication terminal, using the communication module 1532. The processor 1522 may receive a call connection approval signal that is received from the first electronic device 1543 using the communication module 1532 in response to the transmitted call connection request, and transmit the compensated sound to the first electronic device 1543 using the communication module 1532 as a speaker's sound, in response to the received call connection approval.

Figure 15C:
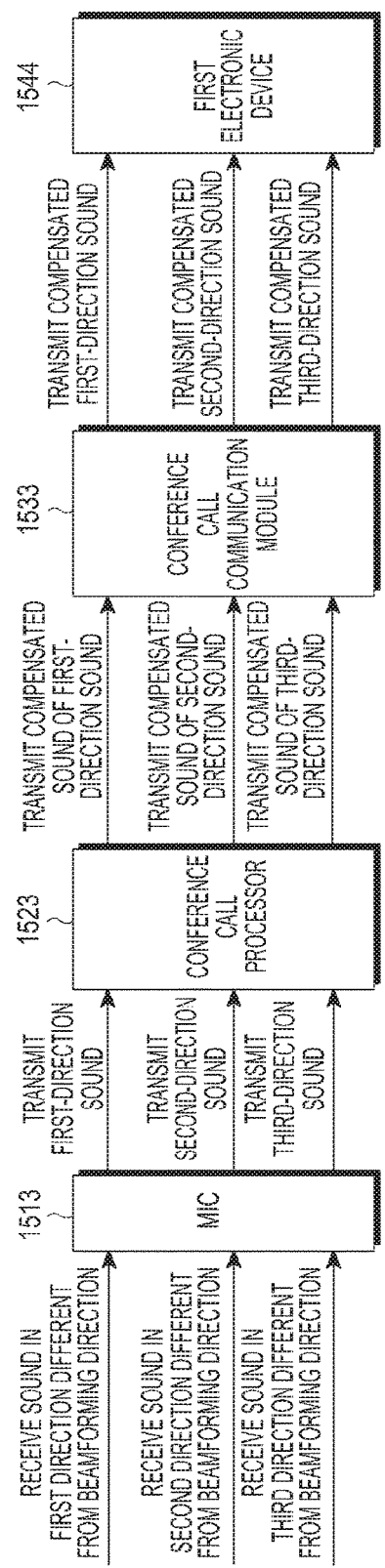

Referring to FIG. 15C, an electronic device may include, for example, a microphone 1513, a conference call processor 1523, and a conference call communication module 1533. The conference call processor 1523 may have the same structure or perform the same function as that of the processor (e.g., the processor 210 of FIG. 2) described with reference to FIGS. 1-15B, and the conference call communication module 1533 may have the same structure or perform the same function as that of the communication module (e.g., the communication module 220 of FIG. 2) described in FIGS. 1-3.

The microphone 1513 may receive a sound in a first direction different from the beamforming direction, a sound in a second direction different from the beamforming direction, and a sound in a third direction different from the beamforming direction, and transmit the sounds received in the first, second and third directions to the conference call processor 1523.

The conference call processor 1523 may compensate the sound transmitted in each of multiple directions, as if a beam is formed in each of multiple directions. For example, if the direction corresponding to a first sound (or a first-direction sound) is a first direction, the conference call processor 1523 may be configured to associate a preset specified time to the first sound as if a form is formed in the first direction using the microphone 1513.

The conference call processor 1523 may transmit each of a first-direction sound that is compensated as if the beam is formed in the first direction, a second-direction sound that is compensated as if the beam is formed in the second direction, and a third-direction sound that is compensated as if the beam is formed in the third direction, to an external first electronic device 1544 using the conference call communication module 1533.

Figure 15D:
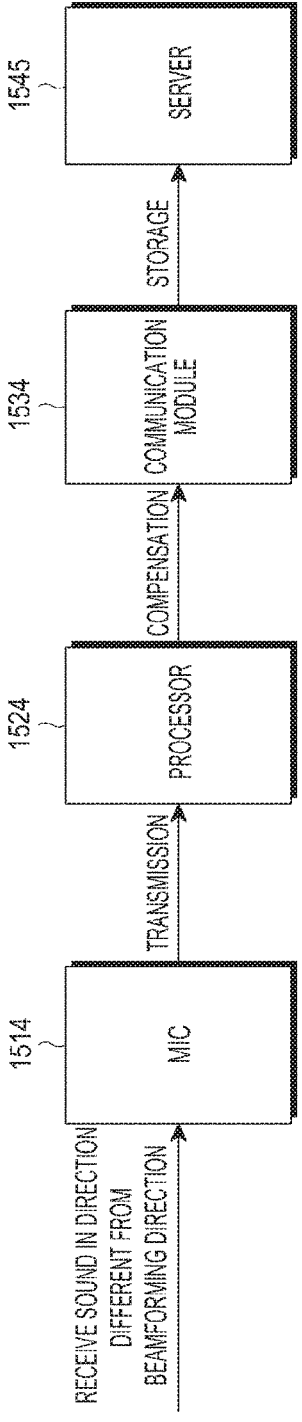

Referring to FIG. 15D, a microphone 1514 of an electronic device may receive a sound in a direction different from the beamforming direction, and transmit the received sound to a processor 1524.

If the sound is transmitted, the processor 1524 may compensate the received sound by associating a preset specified time to the received sound as if the beam is formed in the sound-received direction, and transmit the compensated sound to a communication module 1534 so as to store the compensated sound in a server 1545 outside the electronic device. The communication module 1534 may be configured to store the transmitted compensated sound in the server 1545 outside the electronic device.

Figure 16:
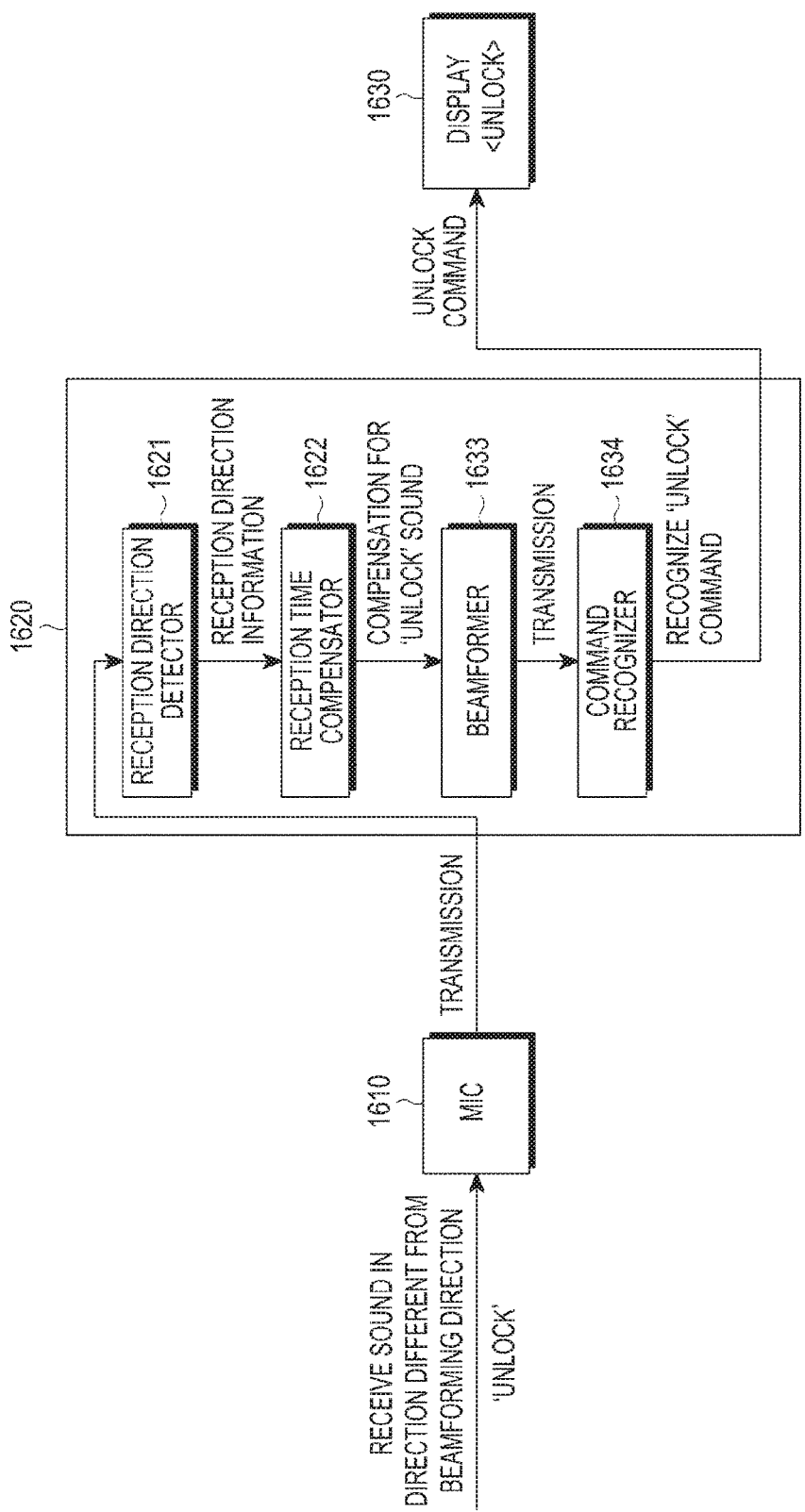
FIG. 16 is a diagram illustrating an operation of recognizing a user command based on a compensated sound, according to an embodiment of the present disclosure.

FIG. 16 is a diagram illustrating an operation of recognizing a user command based on a compensated sound, according to an embodiment of the present disclosure.

Referring to FIG. 16, a microphone 1610 may receive a voice signal including a sound "Unlock" in a direction different from the beamforming direction, and transmit the received voice signal to a reception direction detector 1621 in a processor 1620.

The processor 1620 may include the reception direction detector 1621 for determining a direction of the received voice signal, a reception time compensator 1622 for compensating a reception time of the received signal, a beamformer 1633, and a command recognizer 1634, and a display 1630 may be provided.

The reception direction detector 1621 may detect reception direction information from the transmitted "Unlock" voice signal and transmit the detected reception direction information to the reception time compensator 1622, and the reception time compensator 1622 may compensate the reception time for the "Unlock" voice signal based on the transmitted reception direction information as if the beam is formed in the sound-received direction, and transmit the compensated "Unlock" voice signal to the beamformer 1633, and the beamformer 1633 may transmit the compensated "Unlock" voice signal to the command recognizer 1634.

The command recognizer 1634 may analyze the "Unlock" voice signal that is a transmitted compensated sound, and recognize (or obtain) a "Unlock" command from the "Unlock" voice signal depending on the analysis results.

Upon recognizing the "Unlock" command, the command recognizer 1634 may transmit the "Unlock" command to the display 1630 on which the "Unlock" command is to be displayed. The processor 1620 may transmit, to the display 1630, the "Unlock" command to unlock the display 1630, in response to the "Unlock" voice signal received by the microphone 1610.

An electronic device according to various embodiments of the present disclosure may include a plurality of microphones, a memory configured to store a first specified time set to form a beam in a first direction using the plurality of microphones, and a processor connected to the plurality of microphones and configured to receive a sound using the plurality of microphones, determine a direction corresponding to the received sound, and if the direction is equivalent to a second direction, associate a second specified time to the received sound as if a beam is formed in the second direction using the plurality of microphones.

According to various embodiments of the present disclosure, the processor is further configured to estimate the second specified time based on the first specified time and estimate a second microphone array delay indicative of a time at which the received sound has arrived at the plurality of microphones.

According to various embodiments of the present disclosure, the first specified time is a first microphone array delay corresponding to the first direction.

According to various embodiments of the present disclosure, the second specified time is a difference between the first microphone array delay and the second microphone array delay of the received sound.

According to various embodiments of the present disclosure, the processor is further configured to change the second specified time of the received sound to the first specified time.

According to various embodiments of the present disclosure, the processor is further configured to form the beam in the first direction and a third direction using the plurality of microphones, and the memory is further configured to store a third specified time to form the beam in the third direction.

According to various embodiments of the present disclosure, the processor is further configured to associate, to the received sound, to one of the first specified time and the third specified time corresponding to a direction closer to the second direction.

According to various embodiments of the present disclosure, the memory is further configured to store a first specified received-sound ratio to form a beam in the first direction using the plurality of microphones, and the processor is further configured to associate, to the received sound, the second specified time and a second specified received-sound ratio.

According to various embodiments of the present disclosure, the processor is further configured to estimate the second specified received-sound ratio based on the first specified received-sound ratio and a second microphone array received-sound ratio indicative of a magnitude at which the received sound has arrived at the plurality of microphones.

According to various embodiments of the present disclosure, the first specified received-sound ratio is a first microphone array received-sound ratio corresponding to the first direction.

According to various embodiments of the present disclosure, the processor is further configured to associate the second specified received-sound ratio to the second microphone array received-sound ratio of the sound, which corresponds to the second direction.

According to various embodiments of the present disclosure, the processor is further configured to change the second specified received-sound ratio of the received sound to the first specified received-sound ratio.

According to various embodiments of the present disclosure, the plurality of microphones receive a plurality of sounds, and the processor is further configured, if a direction corresponding to a first sound among the plurality of sounds is equivalent to a fourth direction, to associate a fourth specified time to the first sound as if a beam is formed in the fourth direction using the plurality of microphones.

According to various embodiments of the present disclosure, further comprising an output unit connected to the processor, which is further configured to output, using the output unit, a compensated sound obtained by associating the second specified time to the received sound.

According to various embodiments of the present disclosure, further comprising a communication module connected to the processor, which is further configured to transmit a compensated sound obtained by associating the second specified time to the received sound, to a terminal using the communication module.

According to various embodiments of the present disclosure, the processor is further configured to connect a call to the terminal using the communication module and transmit the obtained compensated sound to the terminal.

According to various embodiments of the present disclosure, the processor is further configured to recognize a user command from a compensated sound obtained by associating the second specified time to the received sound and control an operation of the electronic device in response to the recognized user command.

An input/output method of an electronic device according to various embodiments of the present disclosure may include an input/output method of an electronic device. The input/output method includes storing a first specified time to form a beam, receiving a sound using a plurality of microphones, determining a direction corresponding to the received sound, and if the direction is equivalent to a second direction, associating a second specified time to the received sound as if a beam is formed in the second direction using the plurality of microphones.

According to various embodiments of the present disclosure, the associating of the second specified time to the sound may include changing the second specified time of the received sound to the first specified time.

An electronic device according to various embodiments of the present disclosure may include a plurality of microphones, and a reception time compensator configured to form a beam in a first direction using the plurality of microphones, determine a direction of a sound received using the plurality of microphones, and if the direction is equivalent to a second direction that is different from the first direction, change a microphone array delay of the received sound to a microphone array delay corresponding to the first direction.

In various embodiments, in a storage medium storing instructions, which are configured to allow at least one processor to perform at least one operation when the instructions are executed by the at least one processor, the at least one operation may include storing a first specified time set to form a beam in a first direction using a plurality of microphones; receiving a sound using the plurality of microphones; determining a direction corresponding to the sound; and if the direction is a second direction, associating a second specified time to the sound as if a beam is formed in the second direction using the plurality of microphones.

At least a part of the apparatus (e.g., modules or functions thereof) or method (e.g., operations) according to the present disclosure may, for example, be implemented by an instruction that is stored in computer-readable storage media in the form of a program module. If the instruction is executed by at least one processor (e.g., the processor 120), the at least one processor may perform a function corresponding to the instruction. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) or a flash memory). A program instruction may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a program module according to various embodiments of the present disclosure may include at least one of the above-described components, some of which may be omitted, or may further include additional other components. Operations performed by a module, a program module or other components may be performed in a sequential, parallel, iterative or heuristic way. Some operations may be performed in a different order or omitted, or other operations may be added. Although embodiments disclosed herein have been presented for description and understanding of the technical details, it is not intended to limit the scope of the present disclosure. Therefore, the scope of the present disclosure should be construed to include all changes or various other embodiments based on the technical spirit of the present disclosure.

As is apparent from the foregoing description, in various embodiments of the present disclosure, a delay time (or a microphone array delay) of a sound received using a plurality of microphones may be adjusted to arbitrarily change an incident angle of the currently received sound to the beamforming direction, making it possible to receive the sound of the speaker (or the talker) who quickly moves to an area different from the beamforming area, using the existing fixed beamformer without changing the filter or without changing the physical structure of the microphones.

Further, it is possible to track the speaker using beamforming with the minimum computation and complexity, so beamforming for a speaker in an arbitrary direction or a moving speaker may be readily implemented due to the reduction in computation.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a plurality of microphones;
a memory configured to store a first specified time set to form a beam in a first direction with respect to the electronic device using the plurality of microphones; and
a processor connected to the plurality of microphones and configured to receive a sound using the plurality of microphones, determine a second microphone array delay of the received sound, determine a direction with respect to the electronic device corresponding to the received sound, and if the direction is equivalent to a second direction with respect to the electronic device, associate a second specified time set to the second microphone array delay of the received sound as if a beam is formed in the second direction using the plurality of microphones,
wherein the first specified time set is a first microphone array delay corresponding to the first direction and wherein the second specified time set is a difference between the first microphone array delay and the second microphone array delay of the received sound.

2. The electronic device of claim 1, wherein the processor is further configured to estimate the second specified time set based on the first specified time set and estimate the second microphone array delay indicative of a time at which the received sound has arrived at the plurality of microphones.

3. The electronic device of claim 1, wherein the processor is further configured to change the second specified time set of the received sound to the first specified time set.

4. The electronic device of claim 1, wherein the processor is further configured to form the beam in the first direction and a third direction with respect to the electronic device using the plurality of microphones, and
wherein the memory is further configured to store a third specified time set to form the beam in the third direction.

5. The electronic device of claim 4, wherein the processor is further configured to associate, to the received sound, to one of the first specified time set and the third specified time set corresponding to a direction closer to the second direction.

6. The electronic device of claim 1, wherein the memory is further configured to store a first specified received-sound ratio to form a beam in the first direction using the plurality of microphones, and
wherein the processor is further configured to associate, to the received sound, the second specified time set and a second specified received-sound ratio.

7. The electronic device of claim 6, wherein the processor is further configured to estimate the second specified received-sound ratio based on the first specified received-sound ratio and a second microphone array received-sound ratio indicative of a magnitude at which the received sound has arrived at the plurality of microphones.

8. The electronic device of claim 7, wherein the first specified received-sound ratio is a first microphone array received-sound ratio corresponding to the first direction.

9. The electronic device of claim 8, wherein the processor is further configured to associate the second specified received-sound ratio to the second microphone array received-sound ratio of the sound, which corresponds to the second direction.

10. The electronic device of claim 6, wherein the processor is further configured to change the second specified received-sound ratio of the received sound to the first specified received-sound ratio.

11. The electronic device of claim 1, wherein the plurality of microphones receive a plurality of sounds, and
wherein the processor is further configured, if a direction with respect to the electronic device corresponding to a first sound among the plurality of sounds is equivalent to a fourth direction with respect to the electronic device, to associate a fourth specified time set to the first sound as if a beam is formed in the fourth direction using the plurality of microphones.

12. The electronic device of claim 1, further comprising an output unit connected to the processor, which is further configured to output, using the output unit, a compensated sound obtained by associating the second specified time set to the received sound.

13. The electronic device of claim 1, further comprising a communication module connected to the processor, which is further configured to transmit a compensated sound obtained by associating the second specified time set to the received sound, to a terminal using the communication module.

14. The electronic device of claim 13, wherein the processor is further configured to connect a call to the terminal using the communication module and transmit the obtained compensated sound to the terminal.

15. The electronic device of claim 1, wherein the processor is further configured to recognize a user command from a compensated sound obtained by associating the second specified time set to the received sound and control an operation of the electronic device in response to the recognized user command.

16. An input/output method of an electronic device comprising:
storing a first specified time set to form a beam corresponding to a first direction with respect to the electronic device;
receiving a sound using a plurality of microphones;

determining a second microphone array delay of the received sound and a direction with respect to the electronic device corresponding to the received sound; and if the direction is equivalent to a second direction with respect to the electronic device, associating a second specified time set to the second microphone array delay the received sound as if a beam is formed in the second direction using the plurality of microphones, wherein the first specified time set is a first microphone array delay corresponding to the first direction and wherein the second specified time set is a difference between the first microphone array delay and the second microphone array delay of the received sound.

17. The input/output method of claim 16, wherein associating the second specified time set to the received sound comprises changing the second specified time set of the received sound to the first specified time set.

18. An electronic device comprising:

a plurality of microphones; and a reception time compensator configured to form a beam in a first direction with respect to the electronic device using the plurality of microphones;

determine a first microphone array delay in response to forming the beam in the first direction;

determine a second microphone array delay of a sound received using the plurality of microphones;

determine a direction with respect to the electronic device of the received sound; and if the direction is equivalent to a second direction with respect to the electronic device that is different from the first direction, change the second microphone array delay of the received sound to the first microphone array delay corresponding to the first direction.

* * * * *